US009613251B2

(12) United States Patent
Neskovic et al.

(10) Patent No.: US 9,613,251 B2
(45) Date of Patent: Apr. 4, 2017

(54) FINGERPRINT MATCHING ALGORITHM

(71) Applicant: ZWIPE AS, Oslo (NO)

(72) Inventors: Milan Neskovic, Sremska Mitrovica (RS); Marko Nikolic, Beograd (RS)

(73) Assignee: Zwipe AS, Oslo (NO)

( * ) Notice: Subject to any disclaimer, the term of this patent is extended or adjusted under 35 U.S.C. 154(b) by 144 days.

(21) Appl. No.: 14/439,682

(22) PCT Filed: Nov. 1, 2013

(86) PCT No.: PCT/EP2013/072873
§ 371 (c)(1),
(2) Date: Apr. 30, 2015

(87) PCT Pub. No.: WO2014/068089
PCT Pub. Date: May 8, 2014

(65) Prior Publication Data
US 2015/0286855 A1 Oct. 8, 2015

(30) Foreign Application Priority Data
Nov. 2, 2012 (GB) .................................. 1219749.7

(51) Int. Cl.
G06K 9/00 (2006.01)

(52) U.S. Cl.
CPC ..... G06K 9/00087 (2013.01); G06K 9/00073 (2013.01)

(58) Field of Classification Search
None
See application file for complete search history.

(56) References Cited

U.S. PATENT DOCUMENTS

| 4,752,966 A | 6/1988 | Schiller |
| 6,546,122 B1 | 4/2003 | Russo |
| (Continued) | | |

FOREIGN PATENT DOCUMENTS

| EP | 0050842 A2 | 5/1982 |
| EP | 2141633 A2 | 1/2010 |
| (Continued) | | |

OTHER PUBLICATIONS

Abinandhan Chandrasekaran, et al; Title "Fingerprint Matching Algorithm Based on Tree Comparison Using Ratios of Relational Distances", Department of Computer Science, Univ. of Texas at Dallas, pp. 1-8., dated 2011.

(Continued)

Primary Examiner — Sumati Lefkowitz
Assistant Examiner — David Perlman
(74) Attorney, Agent, or Firm — Eversheds Sutherland (US) LLP

(57) ABSTRACT

A method of matching a reference fingerprint image and an input fingerprint image, represented by a first set of minutiae and a second set of minutiae, including: determining a first local neighborhood for each minutia including at least one minutia neighboring the minutia, comparing the first local neighborhoods in the first set with the first local neighborhoods in the second set to determine matched minutiae, filtering the matched minutiae based on a difference between their positions, determining a second local neighborhood for each unmatched minutia including at least one matched minutia neighboring the unmatched minutia, comparing the second local neighborhoods in the first set with the second local neighborhoods in the second set to determine further matched minutiae, filtering the matched minutiae and the further matched minutiae based on a difference between (Continued)

their positions, and determining whether the first and second fingerprint images are the same.

28 Claims, 12 Drawing Sheets

(56) References Cited

U.S. PATENT DOCUMENTS

| | | |
|---|---|---|
| 6,597,802 B1 | 7/2003 | Bolle et al. |
| 6,681,034 B1 | 1/2004 | Russo |
| 7,236,617 B1 | 6/2007 | Yau et al. |
| 7,274,808 B2 | 9/2007 | Baharav et al. |
| 2003/0123714 A1 | 7/2003 | O'Gorman et al. |
| 2003/0126448 A1 | 7/2003 | Russo |
| 2004/0208348 A1 | 10/2004 | Baharav et al. |
| 2005/0157913 A1 | 7/2005 | Yau et al. |
| 2005/0226479 A1 | 10/2005 | Takahashi |
| 2008/0273770 A1 | 11/2008 | Kohout |
| 2010/0002914 A1 | 1/2010 | Abiko |
| 2010/0002915 A1 | 1/2010 | Govan |
| 2010/0111378 A1 | 5/2010 | Kwan |
| 2010/0127366 A1* | 5/2010 | Bond ............... G06K 9/00026 257/676 |
| 2010/0202671 A1 | 8/2010 | Chen et al. |
| 2010/0232659 A1 | 9/2010 | Rahmes et al. |

FOREIGN PATENT DOCUMENTS

| | | |
|---|---|---|
| WO | 01/80167 A1 | 10/2001 |
| WO | 2004/074978 A2 | 9/2004 |
| WO | 2008/135521 A2 | 11/2008 |

OTHER PUBLICATIONS

Nalini K. Ratha, et al.; Title: "Robust Fingerprint Authetication Using Local Structural Similarity" dated 2000 IEEE, pp. 29-34, XP009125557.

Kai Cao, et al.; Title: "Fingerprint Matching by Incorporating Minutiae Discriminability", dated 2011 IEEE, pp. 1-6.

Tamer Uz, et al.; Title "Minutiae-Based Template Synthesis and Matching Using Hierarchical Delaunay Triangulations", dated 2007 IEEE, pp. 1-8.

* cited by examiner

FINGERPRINT MATCHING ALGORITHM

RELATED APPLICATIONS

The present application is related to International Application No. PCT/EP2013/072874, entitled "Fingerprint Enrolment Algorithm," the national phase of which is filed herewith. International Application No. PCT/EP2013/072874 is incorporated herein by reference in full.

TECHNICAL FIELD

The present invention relates to minutia-based fingerprint analysis. More particularly, the present invention relates to a method of comparing a first set of minutiae and a second set of minutiae.

BACKGROUND OF THE INVENTION

A fingerprint is made up of interleaved ridges and valleys on the surface of a finger. A typical ridge varies in width from about 100 µm to 300 µm and a typical peak-to-peak ridge spacing is about 500 µm. A fingerprint image is a representation of those ridges and valleys, with ridge lines being typically represented as dark lines and the valleys between them are bright lines. An exemplary fingerprint image is shown in FIG. 1.

Fingerprints are unique to an individual, making them ideal for identification purposes. A fingerprint verification system can therefore verify a user's identity by comparing a captured fingerprint image with a pre-stored template fingerprint image. Although each fingerprint is unique to an individual, fingerprints share common features. These may be categorised as follows.

Level 1 features of a fingerprint include loops, whorls, arches and deltas formed by the ridges. These features describe the overall shape followed by the ridges. Level 1 features may be used to distinguish between two non-matching fingerprints, but do not give sufficient detail to confirm a match between two fingerprints.

Level 2 features of a fingerprint, or minutiae, are irregularities or discontinuities in the ridges. Eighteen different types of minutiae have been identified. However, the two major types of minutiae are ridge terminations and ridge bifurcations, i.e. where a ridge ends or where a ridge divides into two ridges. By comparison of Level 2 features, a match between two fingerprints can be confirmed.

Level 3 features of a fingerprint describe intra-ridge details. These include sweat pores and local ridge shape, as well as scarring, warts, creases and other local deformation of the ridges. The extraction of Level 3 features requires high resolution fingerprint sensors (typically greater than 800 dpi).

The following disclosure relates to fingerprint verification based on the analysis of Level 2 features.

Fingerprint verification is the one-to-one comparison of an input fingerprint with a reference fingerprint image for the purpose of either accepting or rejecting a claim of identity. It is common in the art to store, and thus compare, only a fingerprint template rather than the full fingerprint image. A fingerprint template is a set of key features extracted from the fingerprint image, such as minutiae points, that describe the fingerprint image.

The extraction of minutiae from a fingerprint image to form the template typically requires a gray-scale fingerprint image to be enhanced and then converted into a binary image. Fingerprint enhancement typically includes Gabor filtering, which improves discrimination between the ridges and valleys. The fingerprint image is binarised by setting a global threshold t and setting all pixels with intensity greater than t to 1 and all remaining pixels to 0 to produce a binary fingerprint image, and the binary fingerprint image is then thinned such that all ridges are reduced to one pixel width (see for example Zhang T. Y. and Suen C. Y. "A Fast Parallel Algorithm for Thinning Digital Patterns", Communications of the ACM, v.27 n.3, pp. 236-239, 1984) to produce a thinned ridge map, also know as a fingerprint skeleton.

Minutia detection is a trivial task when an ideal thinned ridge map is obtained. This can be seen from FIG. 2, which shows a thinned ridge map of the fingerprint image of FIG. 1 in which the minutiae points for ridge endings and ridge bifurcations are highlighted. The squares represent ridge endings and the circles represent ridge bifurcations.

FIG. 3 shows a minutiae representation of the fingerprint in FIG. 1. Each minutia is typically stored as a data point defined by a position within the fingerprint, a minutia type (i.e. ridge ending, ridge bifurcation, etc.) and a minutia angle (i.e. the orientation of the minutia relative to a reference orientation).

Fingerprint verification may be seen to comprise two distinct stages, enrolment and matching. Enrolment is the process of registering a new reference fingerprint image template and broadly comprises scanning a fingerprint and extracting a fingerprint template from that scan, and matching is the process of comparing a further input fingerprint with that fingerprint template, usually at a later time, in order to verify the identity of a user.

In known enrolment methods, a fingerprint image is input by being scanned by a fingerprint sensor. After the fingerprint image is obtained, feature extraction is performed, for example minutiae extraction as discussed above. Feature extraction provides a template that completely describes the fingerprint.

U.S. Pat. No. 4,752,966 describes a prior art method of enrolling a fingerprint using a swipe-type fingerprint sensor.

Matching of a fingerprint involves taking an input fingerprint image and comparing the input fingerprint image to one or more reference fingerprint images. The print is verified when a match is made between the input fingerprint image and a reference fingerprint image that has a sufficient reliability that the probability of a false positive is below some predetermined threshold.

US 2008/0273770 describes a prior art method of matching a proffered fingerprint image with a reference fingerprint image using minutia comparison. In US 2008/0273770, for each minutia of the input fingerprint, a "minutia neighbourhood" is identified centred around a central minutia and defining a finite region around the central minutia including at least a second minutia. In each neighbourhood, a minutiae pair is defined for each pair of the central minutia with a neighbouring minutia. Each minutiae pair is described by several features including the spacing between the two minutiae in a pair, the difference of orientations of two minutiae and the angle between the orientation of the central minutia and a line connecting the two minutiae. From these minutiae pair features, a minutiae pair index is constructed. Minutiae pair indices of a reference fingerprint image are compared to those of the proffered fingerprint to determine whether the fingerprints match.

SUMMARY OF THE INVENTION

Viewed from a first aspect, the present invention provides a method of comparing a first set of minutiae and a second set of minutiae, the method comprising: determining a first local neighbourhood for each minutia in the first set of minutiae and in the second set of minutiae, wherein each first local neighbourhood includes at least one minutia neighbouring the respective minutia; comparing the first local neighbourhoods of the minutiae in the first set of minutiae with the first local neighbourhoods of the minutiae in the second set of minutiae to determine matched minutiae appearing in both the first and second sets of minutiae, wherein each minutia that is not a matched minutia is an unmatched minutia; determining a second local neighbourhood for each unmatched minutia in the first set of minutiae and in the second set of minutiae, wherein each second local neighbourhood includes at least one matched minutia neighbouring the respective unmatched minutia; and comparing the second local neighbourhoods of the unmatched minutiae in the first set of minutiae with the second local neighbourhoods of the unmatched minutiae in the second set of minutiae to determine further matched minutiae appearing in both the first and second sets of minutiae.

In accordance with the first aspect of the present invention, first and second sets of minutiae are first compared using a local neighbourhood including at least one of their neighbouring minutiae. The neighbouring minutiae of a central minutia comprise any set of minutiae within the same set of minutiae that can be consistently selected based on that central minutia. Matching the minutiae using local frames of reference (using their neighbouring minutiae) means that the matching is independent of the orientation and position of the minutiae within the first or second set. Hence the comparison between the data of the first and second sets may be performed using simple mathematical functions without the need for more complex processing, as would be required to directly compare the two sets of data points. Complex processing would be required to directly compare the two sets of data points because the points would have to be aligned in three dimensions (x, y, θ), whereas local comparison allows for direct comparison between the minutiae without the need for alignment of the set as a whole.

After the first step of matching, there will likely be a number of points that are not matched. This is because the first and second sets of minutiae will typically not correspond exactly for reasons such as: errors when inputting the fingerprint or extracting the minutiae, meaning that not all of the minutiae are extracted or that false minutiae are inadvertently scanned; or where one or both of the sets of minutiae represents a partial fingerprint, meaning that a number of minutiae of the complete fingerprint are outside of the partial fingerprint and thus cannot be extracted.

When the minutia in the first and second sets of minutiae do not correspond exactly, a particular minutiae that appears in both the first and second sets of minutiae may not be matched if its neighbouring minutia do not appear in both of the first and second sets of minutiae.

In accordance with the first aspect of the present invention, the first and second sets of minutiae are then subsequently compared using a second local reference system based on matched neighbouring minutiae. The matched neighbouring minutiae of a minutia similarly comprise any set of minutiae that can be consistently selected based on the central minutia, but that were also matched in the first step of matching based on the first local neighbourhoods.

Matching the minutiae using matched neighbouring minutiae means that the local reference frame will be defined only with reference to minutiae that appear in both the first and second sets of minutiae. Missing minutiae or false minutiae do not appear in both sets and therefore will not be matched in the first step of matching. Thus, even if some minutiae are missing, or false minutiae are present, the use of a local reference system based on matched neighbouring minutiae will not be affected by these. Therefore, the maximum number of minutiae that appear in both the first and second sets of minutiae will be matched.

Typically, one of the first set and the second set of minutiae will relate to a reference template previously enrolled for authorisation purposes and the other will be a template produced from a fingerprint sensor or similar. The reference template may be stored in a memory or similar and in some cases it may be desirable to also or alternatively store previously determined first local neighbourhoods for the minutia of the reference template. In the latter case, the step of determining first local neighbourhoods for the set of minutiae from the reference template may comprise retrieving the stored information on the first local neighbourhoods, rather than generating those first local neighbourhoods at the same time as generating the first local neighbourhoods for the other set of minutiae.

Whilst the method of the first aspect is applicable to any print representable by a set of minutiae, the invention is particularly applicable to fingerprints. Thus, preferably the first set of minutiae represents a reference fingerprint image and the second set of minutiae represents an input fingerprint image.

Input fingerprint images are often partial fingerprint images and are thus particularly prone to missing minutiae at the periphery of the scan area. The present invention is particularly useful in cases where one of the sets of minutiae represents an input fingerprint because it allows minutiae close to the periphery of the scanned area to be matched using a local coordinate reference system, which is very computationally efficient. However, the method is still applicable in conventional minutiae comparison when the sets of minutiae represent complete prints as there are almost inevitably false or missing minutiae in any print representation.

The method preferably further comprises: receiving the first set of minutiae representing the input fingerprint from a fingerprint sensor; and receiving the second set of minutiae representing the second fingerprint from a memory. As, for example, in the case where the second set of minutiae represent a reference fingerprint.

Whilst the method of the first aspect may be used to provide some form of comparison index, for example a confidence score of a match or the number or percentage of matched minutiae, the method preferably further comprises, after determining the further matched minutiae, determining whether the first and second fingerprints are the same. The determining may comprise determining that the prints are matched when the number of matched minutiae exceeds a predetermined number of minutiae. The predetermined number of minutiae may be a predetermined percentage of the total number of minutiae in the first and/or second sets of minutiae.

Any suitable comparison algorithm may be utilised to determine matched minutia appearing in both the first and second sets of minutia. Preferably, the comparison is rotation and translation invariant so as to improve computational efficiency. This may be achieved by using relative distances and angles with respect only to the position and orientation of the central minutia. Thus, the comparing of the first local neighbourhoods may be based on a relative relationship in the form of at least one of: a relative position, a relative orientation and a relative minutia angle of each of the at least one neighbouring minutia relative to a central minutia of the respective first local neighbourhood.

Whilst a direct comparison between first local neighbourhoods is possible, any false or missing minutiae within either of the first local neighbourhoods will prevent the first local neighbourhoods from being matched. A more efficient method of matching instead includes comparing the relationships between each central minutia with each of its neighbouring minutia, and determining a match when any one relationship in a first local neighbourhood matched any one relationship in another first local neighbourhood match.

Thus, the method preferably further comprises: for each first local neighbourhood, determining a relative relationship between a central minutia of the first local neighbourhood and each of the at least one neighbouring minutia, wherein comparing the first local neighbourhoods comprises comparing each relative relationship of the first local neighbourhoods of the minutiae in the first set of minutiae with each relative relationship of the first local neighbourhoods of the minutiae in the second set of minutiae, and wherein a matched minutiae is determined as appearing in both the first and second sets of minutiae when a difference between one relative relationship of the respective first local neighbourhood of the minutiae in one of the sets of minutiae and one relative relationship of the first local neighbourhood of the minutiae in the other set of minutiae is below a predetermined threshold.

By virtue of this method, in order to be matched, the first local neighbourhood need only capture at least one minutia appearing in both sets of minutiae.

The matched minutia should not include any false minutiae, or minutiae corresponding to missing minutiae. Therefore, a direct comparison of the second local neighbourhoods should be effective. However, the same method of comparison is may be utilised when matching both the first local neighbourhoods and the second local neighbourhoods in order to simplify the algorithm.

Thus, the method may also comprise: for each second local neighbourhood, determining a relative relationship between a central minutia of the second local neighbourhood and each of the at least one neighbouring matched minutia, wherein comparing the second local neighbourhoods comprises comparing each relative relationship of the second local neighbourhoods of the unmatched minutiae in the first set of minutiae with each relative relationship of the second local neighbourhoods of the unmatched minutiae in the second set of minutiae, and wherein a matched minutiae is determined as appearing in both the first and second sets of minutiae when a difference between one relative relationship of the respective second local neighbourhood of the unmatched minutiae in one of the sets of minutiae and one relationship of the second local neighbourhood of the unmatched minutiae in the other set of minutiae is below a predetermined threshold.

The same predetermined threshold may be used for comparison both of the first local neighbourhoods and of the second local neighbourhoods. However, a different threshold may instead be used.

The method may utilise just one of a relative position, a relative orientation and a relative minutia angle as the relative relationship. In preferred embodiments more than one or all of these parameters are used in the matching of minutiae.

Optionally, the above method of matching local neighbourhoods may be used independently of the method of the first aspect. That is to say that this method of matching local neighbourhoods may be used without a second step of matching.

Thus, in an alternative aspect, the present invention also provides a method of comparing a first set of minutiae and a second set of minutiae, the method comprising: determining a first local neighbourhood for each minutia in the first set of minutiae and in the second set of minutiae, wherein each first local neighbourhood includes at least one minutia neighbouring the respective minutia; for each first local neighbourhood, determining a relative relationship between a central minutia of the first local neighbourhood and each of the at least one neighbouring minutia, comparing each relative relationship of the first local neighbourhoods of the minutiae in the first set of minutiae with each relative relationship of the first local neighbourhoods of the minutiae in the second set of minutiae; and determining matched minutiae appearing in both the first and second sets of minutiae when a difference between one relative relationship of the respective first local neighbourhood of the minutiae in one of the sets of minutiae and one relationship of the first local neighbourhood of the minutiae in the other set of minutiae is below a predetermined threshold. In preferred embodiments this alternative aspect may further include any or all of the preferred features discussed in relation to the method of the first aspect.

Returning to the method of the first aspect, the matching of minutiae sets using a local frame of reference is computationally efficient, but can be prone to obvious errors, such as where local neighbourhoods in the first and second sets of minutiae appear similar, but are in completely different locations within the overall fingerprint. An optional step of filtering based on a comparison between the absolute position and/or orientation of the matched minutiae within the respective sets of minutiae can be used to catch some of these erroneous matches. The method therefore preferably further comprises providing a position and a minutia angle of each minutia within the first and second sets of minutiae; and, after the first step of matching and before the second step of matching, filtering the matched minutiae based on the position and/or orientation of each of the matched minutiae within the first and second sets of minutiae.

Preferably the position is defined using Cartesian coordinates relative to a common reference point for all of the minutiae within the set of minutiae. However, any suitable coordinate reference scheme may instead be used, for example radial coordinates relative to a core of the fingerprint may be appropriate in some circumstances.

Due to the reduced number of minutiae being compared, the second step of matching is less prone to the above described errors. However, this type of error can still occur and thus filtering may also be applied after the second step of matching. The method thus preferably further comprises, after both of the first step of matching and the second step of matching, filtering matched minutiae based on the position and/or orientation of each of the matched minutiae within the first and second sets of minutiae.

Preferably, the above filtering is based on a relative position and/or a relative orientation of each of the matched minutiae between the first and second sets of minutiae. The filtering may therefore comprise: determining a relative position and/or a relative orientation of each matched minutia between the first and second sets of minutiae; and filtering out matched minutiae having a relative position and/or a relative orientation that is outside of a predetermined range.

The relative position and orientation of a mismatched minutia between the first and second sets of minutiae will typically be significantly different to that of correctly matched minutiae, which will be approximately the same. Therefore, a relatively small range can be defined around these correctly matched minutiae and any matched minutiae that fall outside of this range can be assumed to be incorrectly matched.

The centre of the predetermined range is preferably such that a maximum number of matched minutiae fall within the predetermined range. Although many methods may be used to determine this range, the centre of the predetermined range is preferably the average, more preferably the median, of the relative positions and/or the relative orientations.

The range should be moved so as to maximise the number of matched minutiae captured as the location where most of the matched minutiae are clustered should be close to the actual offset of the two sets of minutiae, assuming that they match. The use of the average relative position or relative orientation to centre the predetermined range provides a computationally efficient method for selecting as many of the matched minutiae as possible within that range. Particularly, most of the matched minutiae would be expected to be correct therefore the median relative position or orientation should be at approximately the centre of the cluster of correctly matched minutiae.

Preferably the comparing the first local neighbourhoods comprises: determining a similarity score based on a similarity between each first local neighbourhood of the first set of minutiae and each first local neighbourhood of the second set of minutiae; and determining a minutia is matched between the first and second sets of minutiae when its similarity score meets a predetermined similarity threshold.

Where a minutia is paired with two other minutiae in the other set, i.e. it has a similarity score meeting the similarity threshold with respect to two local vectors in the other set of minutiae, at least one of these matches must be incorrect. This may be detected by filtering; however this can be avoided by only allowing a pair to be matched with the most similar neighbourhood. The method may therefore comprise determining the matched minutiae between the first and second sets of minutiae by ranking each pair of minutiae between the first and second sets of minutiae by similarity score; and sequentially determining matched minutiae with decreasing similarity when the similarity score meets the similarity threshold and when neither of the pair of minutiae is a matched minutiae. Filtering based on a similarly score may be applied either before or after filtering based on relative minutia positions between the first and second sets of minutiae.

The method of comparing first local neighbourhoods may similarly be applied to the method of comparing second local neighbourhoods.

The comparing of the second local neighbourhoods preferably further comprises: determining a similarity score based on a similarity between each second local neighbourhood of the first set of minutiae and each second local neighbourhood of the second set of minutiae; and determining a minutia is a further matched minutia between the first and second sets of minutiae when the similarity score meets a predetermined similarity threshold.

The method preferably further comprises: determining the further matched minutiae between the first and second sets of minutiae by ranking each pair of minutiae between the first and second sets of minutiae by similarity score; and sequentially determining the further matched minutiae with decreasing similarity when the similarity score meets the similarity threshold and when neither of the pair of minutiae is a matched minutiae.

Although a local neighbourhood need only include a single neighbouring minutia, the use of such a small local neighbourhood significantly increases the probability of failing to capture at least one neighbouring minutia that is not a missing or false minutia. Therefore each first local network preferably includes three minutiae neighbouring the respective minutia, and each second local network preferably includes three matched minutiae neighbouring the respective unmatched minutia.

By using at least three neighbouring minutia, the chance of failing to capture at least one neighbouring minutia that is not a missing or false minutia is significantly reduced; however, the size of the local neighbourhood is still sufficiently small so as not to significantly impact processing time.

As noted above, the neighbouring minutiae may be any set of minutiae that can be consistently selected; however, preferably the at least one minutia is the at least one closest minutia and more preferably the three closest minutiae.

Viewed from a second aspect, the present invention also provides a data processing apparatus for comparing a first set of minutiae and a second set of minutiae based on data representing the sets of minutiae, the data processing apparatus being arranged to carry out a method as described above in the first aspect or subsidiary aspect and preferred features thereof. For example, in an apparatus relating to the first aspect the apparatus may be arranged to: determine a first local neighbourhood for each minutia in the first set of minutiae and for each minutia in the second set of minutiae, wherein each first local neighbourhood includes at least one minutia neighbouring the respective minutia; compare the first local neighbourhoods of the minutiae in the first set of minutiae with the first local neighbourhoods of the minutiae in the second set of minutiae to determine matched minutiae appearing in both the first and second sets of minutiae, wherein each minutia that is not a matched minutia is an unmatched minutia; determine a second local neighbourhood for each unmatched minutia in the first set of minutiae and for each unmatched minutia in the second set of minutiae, wherein each second local neighbourhood includes at least one matched minutia neighbouring the respective unmatched minutia; and compare the second local neighbourhoods of the unmatched minutiae in the first set of minutiae with the second local neighbourhoods of the unmatched minutiae in the second set of minutiae to determine further matched minutiae appearing in both the first and second sets of minutiae.

The data processing apparatus may comprise a memory and a processor, the memory storing instructions that when executed will cause the processor to perform the steps described above.

In preferred embodiments the data processing apparatus may be arranged to carry out any or all of the preferred features discussed above in relation to the method of the first aspect.

The apparatus may comprise a fingerprint sensor for obtaining fingerprint data and communicating the fingerprint data to the processor for matching with fingerprint data stored on the memory. In a preferred aspect, the apparatus is an electronic card comprising a fingerprint sensor, the memory and the processor. Preferably, the fingerprint sensor has a width of less than 10 mm, and more preferably less than 7 mm.

Electronic cards typically have very strict power requirements as they are either powered by onboard batteries or draw power from a reader when used. This means that the components used on the electronic card, particularly the processor and the fingerprint sensor, must be low-power devices, which limits the processing power of the processor and the available size of the fingerprint sensor.

The method of the first aspect of the invention is very economic in computational terms meaning that it can match prints quickly when implemented in an electronic card having lower processing power. Additionally, the method is particularly effective at matching prints when one of the prints is a partial print, which will be the case when a narrow-width fingerprint sensor is used since the width of the sensor is less than the typical width of a fingerprint.

Viewed from a third aspect, the present invention also provides a computer program product, or a tangible computer readable storage medium storing the computer program product, the computer program product comprising instructions that when executed will cause a processor to perform the method of the first aspect and optionally any or all of the preferred features discussed above.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWING

Certain preferred embodiments of the present invention will now be described in greater detail by way of example only and with reference to the following figures, in which.

The following preferred embodiments of the invention relate particularly to fingerprints.

DETAILED DESCRIPTION

The term fingerprint is intended to mean a print (a graphic representation of ridges and valleys) of a finger (including the thumb). However, it will be understood that the method is not limited to fingerprints, but is applicable to any print that can be represented by a set of minutiae points. Such prints include, for example, prints from fingers, palms, toes and soles.

Figure 4A:
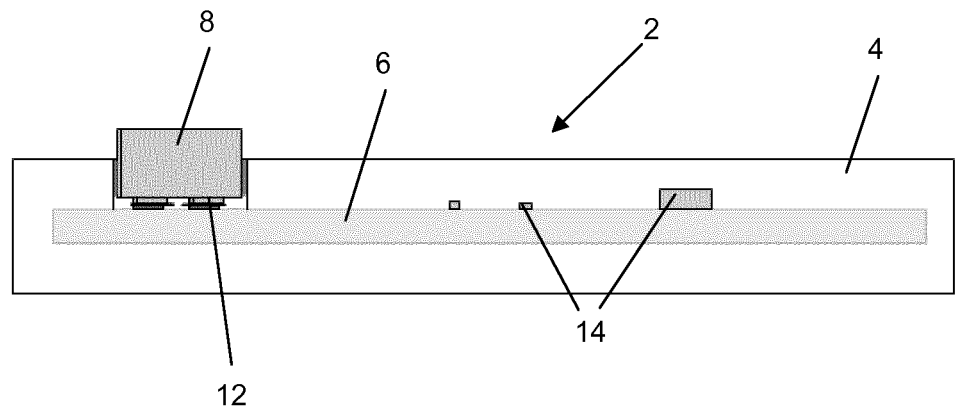
FIG. 4A shows a partially cut-away side view of an electronic card including a fingerprint swipe sensor.
Figure 4B:
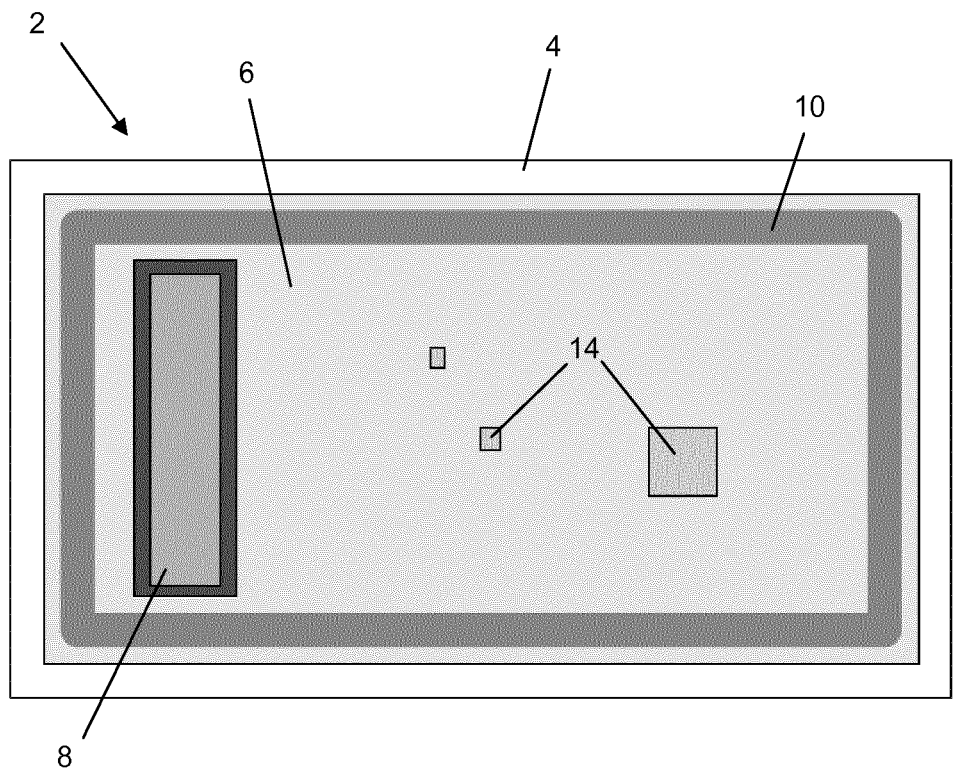
FIG. 4B shows a partially cut-away top view of an electronic card including a fingerprint swipe sensor.

FIGS. 4A and 4B show partially cut-away views of an electronic card 2 including a fingerprint swipe sensor 8. The following preferred embodiments will be described with reference to the electronic card 2. The fingerprint sensor 8 can be incorporated into any suitable smart card as a biometric sensor for additional security. The electronic card 2 shown in FIGS. 4A and 4B is not to scale and certain features have been emphasised. Particularly, the thicknesses of the card body 4 and of the circuit 6 have been enlarged so as to more clearly illustrate the features of the smart card. Also, the size of the fingerprint sensor 8 is not necessarily in scale with the size of the smart card 2.

Smart cards are generally of a similar size to a conventional credit card and have a similar look and feel. Conventional credit cards are manufactured in accordance with international standard ID-1 of ISO/IEC 7810, that is to say having dimensions of 3⅜ inches by 2⅛ inches (approx. 86 mm by 54 mm) and a thickness of 6 mil (approx. 0.75 mm). The smart card may be thicker than a conventional credit card in order to accommodate a circuit and fingerprint sensor.

In contact smart cards, often known as chip cards, metal contacts are brought to the surface of the card in a predetermined pattern to form a contact pad, which is accessible from the outside of the card. These contacts are connected to a microprocessor inside of the card. Smart cards of the first type are commonly used by being slid into a recess of a card reader such that spring loaded contacts in the card reader make contact with the contact pad on the card in order to read the contents of the microprocessor.

In contactless smart cards, often known as proximity cards, the contents of the microprocessor are transmitted to the reader using non-contact communication technology. One example of such is radio-frequency identification (RFID), where an antenna is formed within the body of the card and a radio-frequency electromagnetic field is generated by a reader to read the contents of the microprocessor. Encryption may be employed in smart cards of this type to ensure secure transmission of messages between the card and the reader.

The example smart card 2 of FIGS. 4A and 4B is a contactless smart card 2 that comprises a card body 4 and a circuit 6 enclosed within the card body. The circuit 6 is in the form of a printed circuit board, which is preferably made from poly amide or FR-4 grade glass-reinforced epoxy laminate. A fingerprint sensor 8 is attached to the circuit 6 via a hole formed in the card body 4. An example of a suitable fingerprint sensor is the FPC 1080A fingerprint sensor manufactured by Fingerprint Cards AB of Sweden. This is a capacitive swipe-type fingerprint sensor.

The circuit 6 is laminated between at least two layers of plastic. The layers of plastic would typically be made of PVC; however, other plastics may be used. Examples of other suitable plastics include polyester, acrylonitrile-butadiene-styrene (ABS), and any other suitable plastic. Additionally, plasticisers or dyes may be added to the plastic to achieve a desired look and feel.

An antenna 10 is connected to the circuit 6. The antenna 10 is used to communicate with a card reader, which is external to card 2. The antenna 10 may be formed by etching a suitable pattern onto a copper cladding of the printed circuit board. The antenna in this embodiment surrounds the whole circuit 6, but in other embodiments it may occupy a smaller area of the card. For example, an antenna surrounding approximately a third of the area of the card is sufficient for most purposes.

The fingerprint area sensor 8 is joined to the circuit 6 via contacts 12. The circuit 6 also includes a number of additional components 14. These can include a processor and a memory. The memory is arranged to store both software and information associated with the smart card 2. For example, this may include the identity of a bearer of the smart card 2, account information of the bearer of the smart card 2, and so on. The processor is arranged to control operation of the smart card. Particularly, subject to verification of the bearer of the smart card 2, for example by use of a password or PIN and/or via data from the fingerprint sensor 8, the processor is arranged to communicate the data stored on the memory to a card reader.

The additional components 14 may include a battery, which is configured to power the memory and processor. Alternatively, or in addition to the battery, the card may be arranged to be powered via a contact pad external to the smart card 2 or to draw power from the antenna 10 when it is energised by a card reader.

Figure 5:
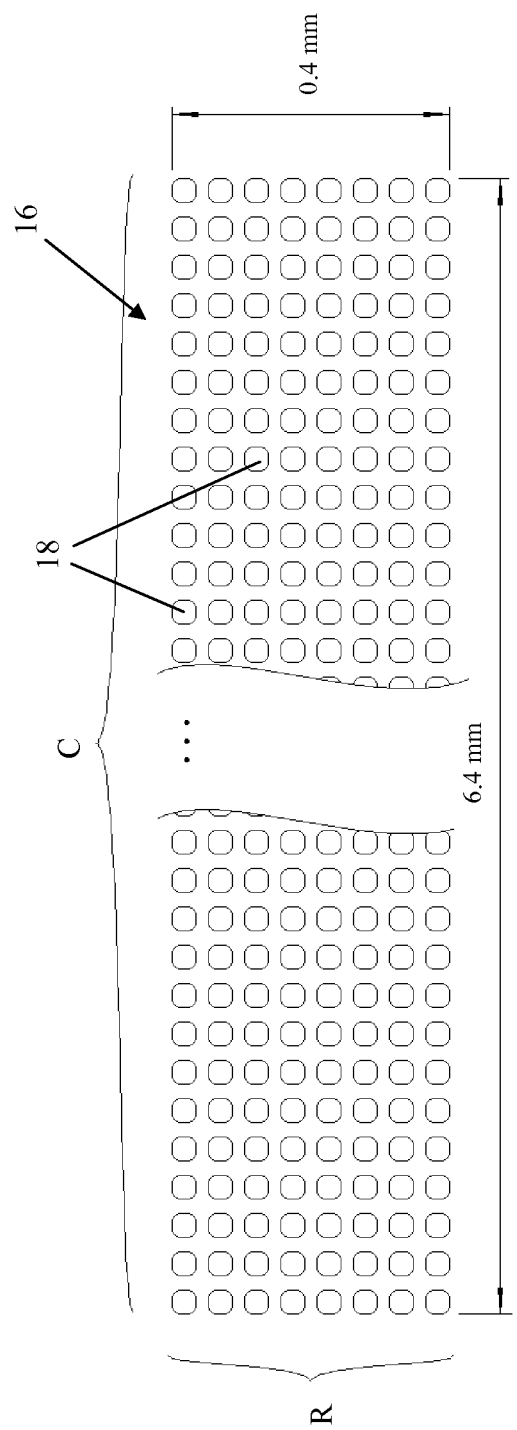
FIG. 5 shows a pixel matrix of the fingerprint swipe sensor of FIG. 4.

FIG. 5 shows the features of the fingerprint swipe sensor 8. A scan area 16 of sensor is made up of a number of pixels 18 in an array with rows R and columns C. The fingerprint sensor 8 in this embodiment is based on the FPC 1080A fingerprint swipe sensor mentioned above. This sensor is made up of an array of pixels 18 with eight rows R and 128 columns C, with a width of 6.4 mm and a height of 0.4 mm, hence providing a resolution of 508 dpi. It is an active capacitive type sensor. The fingerprint sensor 8 generates an 8-bit grey scale value as a representation of the fingerprint and hence a single frame/image from the sensor 8 is 8 kb large.

An image of the fingerprint is obtained by swiping a finger over the fingerprint sensor 8. When the finger is moved across the fingerprint sensor 8 at an appropriate rate for the frame rate of the fingerprint sensor 8 (i.e. frames per second captured by the sensor) then it is possible to construct an image of a slice of the fingerprint by assembling a number of frames/images captured by the fingerprint sensor 8. A method of combining the captured frames is discussed, for example, in US 2003/0123714.

The smart card 2 of FIGS. 4A and 4B can be produced by any suitable method, for example by a hot lamination method. Conventional processing techniques, which would be well known to the person skilled in the art, may then be applied to the core to complete the card body 4. Such processing techniques may include inking, the formation of an overlaminate film, or the like.

The fingerprint sensor 8 can be fitted to the card body using a method as described below, although other techniques can also be used.

In the preferred method the smart card 2 is first formed with the laminated body 4 enclosing the circuit 6. The circuit 6 includes contacts 12 that are designed to connect with corresponding contacts on the fingerprint area sensor 8, but immediately after the card body is formed these contacts 12 are encased within the laminated body 4.

A cavity is formed in the card body 4 to expose the contacts 12 in the circuit 6. The cavity is formed on an upper surface of smart card body 4 and is sized substantially in conformity with the shape of the fingerprint area sensor 8, such that the fingerprint area sensor 8 will just fit within the cavity. The cavity is milled into the surface of the card body 4. This may be done using a precision end mill or, more preferably, a laser mill. The depth of the milling is set so that the base of the cavity is at the level of the circuit 6 within the card body 4, such that the contacts 12 are exposed.

A conductive epoxy is applied to the surface of the exposed contacts 12 in order to provide the necessary electrical connection between the sensor 8 and the circuit 6. A suitable conductive epoxy is type SEC1222 epoxy, manufactured by Resinlab, LLC of Wisconsin USA, which cures at room temperatures (approx. 25° C.).

Alternatively, a conductive epoxy having a strongly anisotropic characteristic may be used. This is beneficial when the contacts on the fingerprint sensor 8 are very close together because it provides the required conductivity between the fingerprint area sensor 8 and the contacts 12 in the circuit 6, whilst ensuring that even if the conductive epoxy flows between adjacent contacts 12, it will not form any appreciable conductive path between them.

Interior walls of the cavity are coated with an adhesive epoxy prior to the fingerprint sensor 8 being inserted. The adhesive epoxy seals the fingerprint sensor 8 in place.

The fingerprint sensor 8 is then is then aligned with the cavity and pushed into the cavity, such that the contacts on the fingerprint sensor 8 and the contacts 12 in the circuit 6 are brought into electrical contact through the conductive epoxy.

The conductive epoxy and adhesive epoxy preferably cure without heating. However, alternatively, one or both of the conductive epoxy and adhesive epoxy may require heat curing where the curing temperature of the conductive epoxy and/or adhesive epoxy is below a safe temperature of the fingerprint sensor 8, for example below 60° C., which is a typical maximum operating temperature for capacitive sensors of the type used in the preferred embodiment. Higher temperatures may be possible for short time periods and/or for different sensor types.

Whilst the following exemplary methods will be described in relation to the above electronic card, it will be understood that the methods are not limited to this application and may be implemented in any suitable system, such as a computer system having a memory and a processor adapted to receive an input from a fingerprint sensor, or a specialised fingerprint reading/comparing apparatus.

Enrollment

Figure 6:
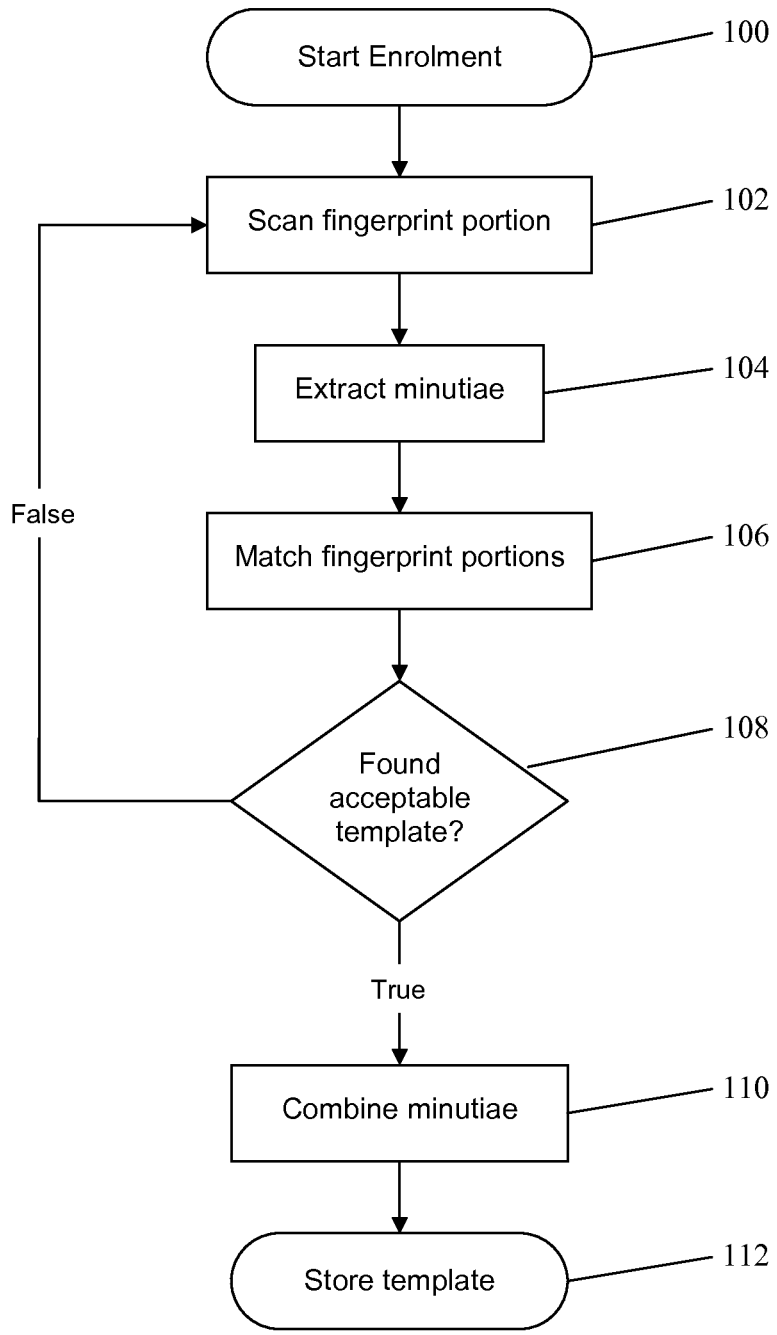
FIG. 6 is a flow chart showing a method of enrolling a fingerprint.

FIG. 6 is a flow chart showing a method of enrolling a reference fingerprint image 20. The method will be described with reference to FIGS. 7 to 9 using an example where the reference fingerprint image 20 to be enrolled is the fingerprint image shown in FIG. 1.

The fingerprint sensor 8 of the smart card 2 is a swipe-type sensor and has scanning area with a width of 6.4 mm, meaning that a scanned portion of a fingerprint will be substantially rectangular. The scanned portion will have a width that is less than the width of the fingerprint, and a length which is longer than the scanned portion's width. Hence, the scanned portion will represent a longitudinal strip of the fingerprint. The following algorithm will assemble three or more intentionally displaced fingerprint scans to produce one wider fingerprint scan to be saved as a template.

Figure 2:
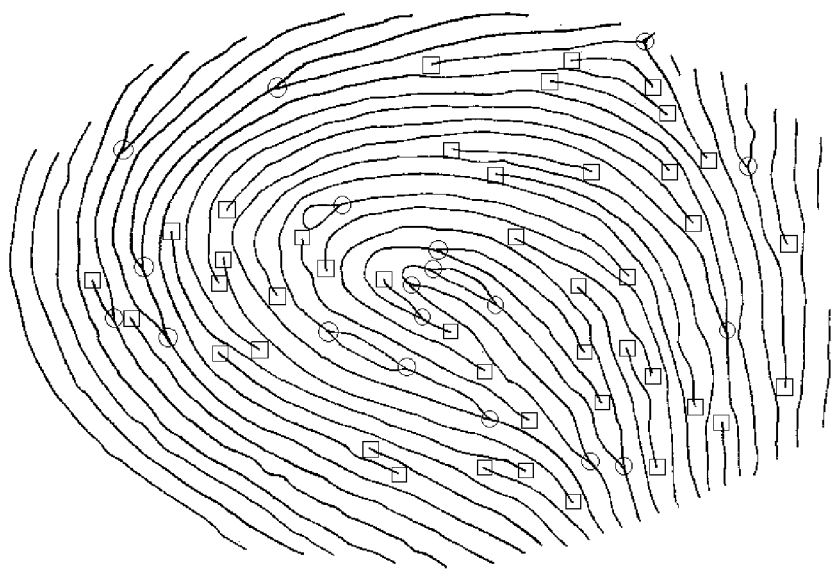
FIG. 2 shows a ridge skeleton of the fingerprint shown in FIG. 1 with ridge endings and ridge bifurcations highlighted.
Figure 1:
FIG. 1 shows a fingerprint image.
Figure 3:
FIG. 3 shows a minutia representation of the fingerprint shown in FIG. 1.
Figure 7:
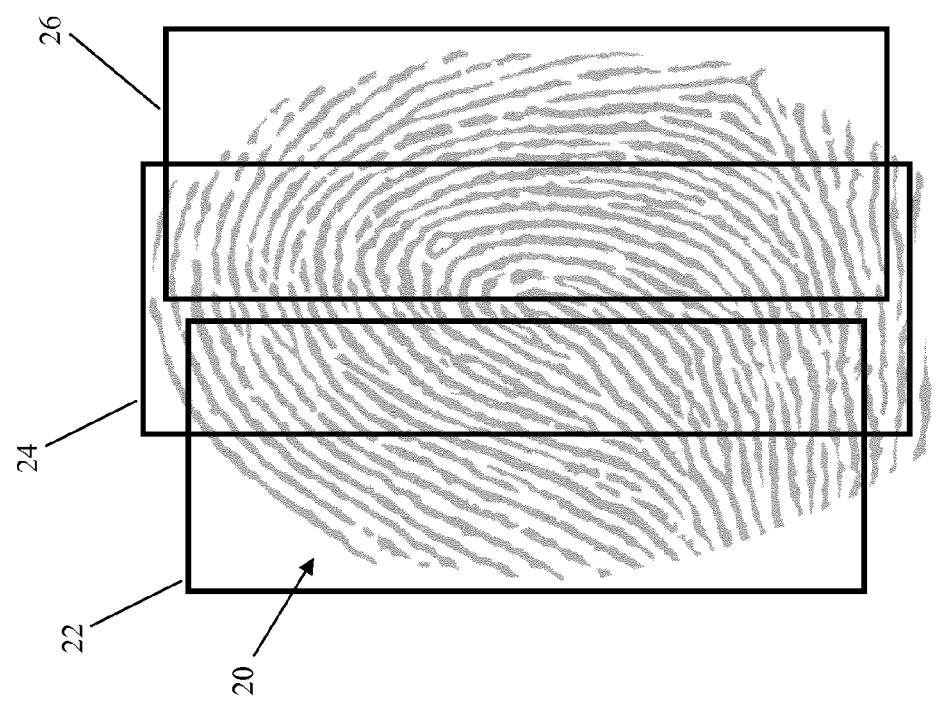
FIG. 7 shows the fingerprint image shown in FIG. 1 with three overlapping strips highlighted.

FIG. 7 shows three exemplary fingerprint image strip 22, 24, 26 of the reference fingerprint image 20 of FIG. 1. As each of the fingerprint image strips 22, 24, 26 has been scanned by the same fingerprint sensor 8, the width of each of the fingerprint image strips 22, 24, 26 is substantially equal, but their lengths may be different. The fingerprint image strips 22, 24, 26 are substantially parallel in their length-wise direction (in the longitudinal direction of the fingerprint). Each of the fingerprint image strips 22, 24, 26 overlaps at least one other fingerprint strip 22, 24, 26 by at least a third of their width.

The algorithm is iterative and will repeat until an acceptable template is found. In order for a template to be deemed acceptable, the following criteria must be met:
- at least three fingerprint image strips 22, 24, 26 have been scanned;
- the at least three fingerprint image strips 22, 24, 26 overlap laterally in series; and
- a width of a region of the fingerprint represented by the overlapped fingerprint image strips 22, 24, 26 is above a predetermined minimum width.

In the first iteration, a first strip 22 of the fingerprint is scanned using the fingerprint sensor 8 to generate a first fingerprint image strip. As discussed above, the first fingerprint image strip 22 has a length that is longer than its width and a width that is less than the width of the reference fingerprint image 20.

Figure 8C:
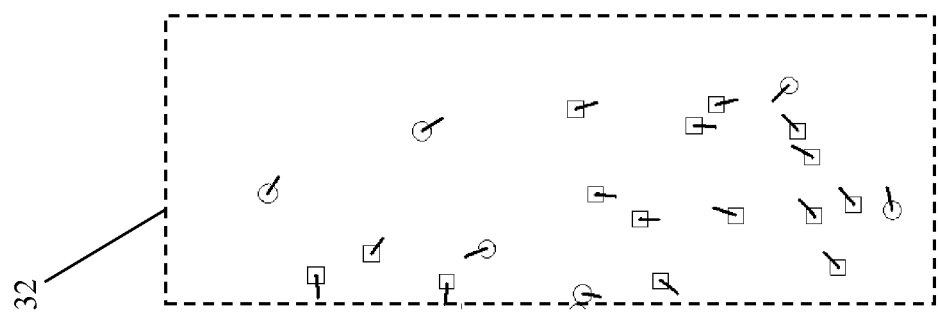
FIGS. 8A-8C show minutia representations of each of the portions in FIG. 7.
Figure 8B:
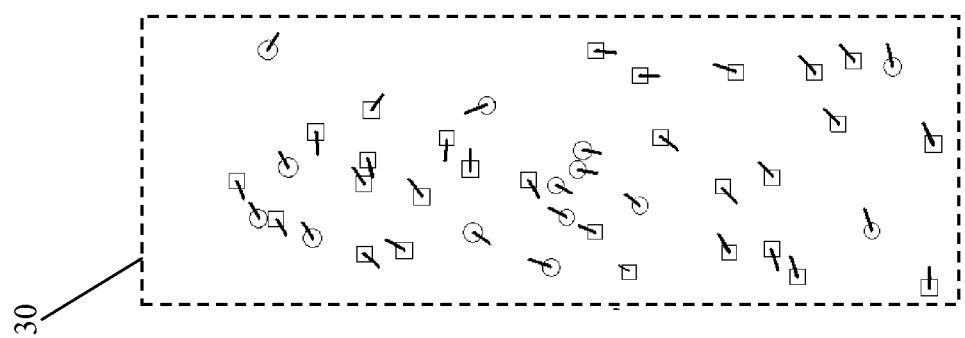
Figure 8A:
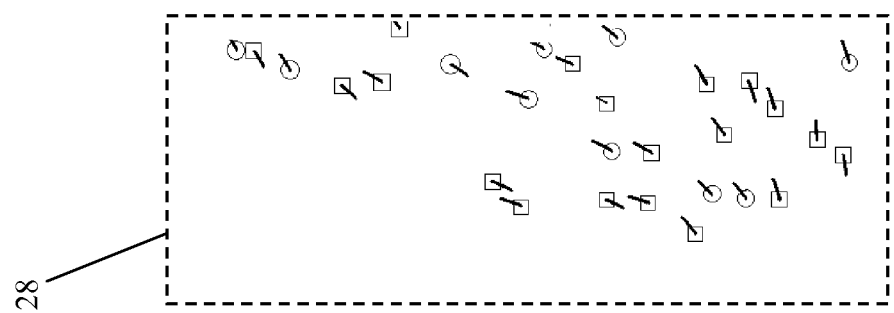

Next, a minutia extraction process is applied to the first fingerprint image strip 22 to determine a minutia representation 28 of the first fingerprint image strip 22. Techniques for minutiae extraction from a fingerprint image are well known in the art and will therefore not be discussed in detail here. FIG. 8A shows a first minutia representation 28 corresponding to the first fingerprint image strip 22 shown in FIG. 7.

Each extracted minutia is stored as a minutia vector, which defines at least a position and a minutia angle of the minutia. The position is defined using Cartesian coordinates relative to a common reference point for all of the minutiae within the minutia representation. Each minutia vector also defines the type of the minutia. The type of minutiae is represented numerically, for example a bifurcation point=1 and a termination point=3. In this embodiment, only bifurcations and terminations are considered as these are simplest to extract, however other types minutiae may additionally or instead be used as required. Thus, the minutia vector for minutia i in a set of minutia vectors composing the minutia representation may be represented as:

$M_i = [x_i, y_i, \phi_i, t_i]$, where x is a horizontal position of the minutia, y is a vertical position of the minutia, $\phi$ is a minutia angle of the minutia relative to the horizontal axis (between 180° and −180°), t is a numerical representation of the type of the minutia, and i is an index of the minutia vector within the set of minutia vectors.

Next the first fingerprint image strip 22 is matched against all previously scanned fingerprint image strips. In this first iteration, only one fingerprint strip has been scanned, and therefore this step (which will be described in detail later) does not apply.

The algorithm then determines whether an acceptable template can be formed. In the first iteration, only one fingerprint image strip 22 has been scanned and thus an acceptable template cannot be formed. A second iteration is therefore performed.

In the second iteration, the scanning and extracting are repeated as described above so as to provide a second fingerprint image strip 24 having a second minutia representation 30. FIG. 8B shows the second minutiae representation 28 corresponding to the second fingerprint image strip 24.

Next the second fingerprint image strip 24 is matched against all previously scanned fingerprint image strips, i.e. the second minutia representation 30 is matched with the first minutia representation 28 to determine whether they overlap and, if so, to determine their relative alignment. Each minutia representation is matched against each other minutia representation using a minutia-based matching method. A suitable matching algorithm is described later in detail.

The result from the matching of the first and second fingerprint image strips 22, 24 is a set of the matching parameters which, if the first and second fingerprint image strips 22, 24 overlap, define the number of matching minutiae, an overlap error probability and a relative offset between the minutia representations.

The overlap error probability is the probability that the fingerprint image strips have been erroneously determined as overlapping and the relative minutiae translation is the average difference in relative position between matched minutiae in the first and second minutiae representations 28, 30 of the fingerprint image strips 22, 24. This corresponds to the match error probability that will be discussed later.

The algorithm then determines whether an acceptable template can be formed. In the second iteration, only two fingerprint image strips 22, 24 have been scanned and again an acceptable template cannot be formed. A third iteration is therefore performed.

In the third iteration, the scanning and extracting is repeated as described above so as to provide a third fingerprint image strip 26 having a third minutia representation 32. FIG. 8C shows the third minutiae representation 32 corresponding to the third fingerprint image strip 26.

The third fingerprint image strip 26 is then matched with all previously scanned fingerprint image strips 22, 24, i.e. the third minutia representation 32 is matched with each of the first and second minutia representations 28, 30 to determine whether it overlaps with any or all of these. This is performed by the method discussed above.

The algorithm then determines whether an acceptable template can be formed.

By the third iteration, three fingerprint image strips 22, 24, 26 have been scanned, and thus the first criterion is satisfied.

Based on the matching parameters determined, if a suitable overlap occurs between the fingerprint image strips 22, 24, 26 such that they can be arranged laterally in series, the second criteria is satisfied. A suitable overlap has a number of matched minutiae that exceeds a predetermined minimum number of minutiae for matching and has an overlap error probability beneath a maximum allowable overlap error probability. A set of fingerprint image strips are arranged laterally in series when, between two end fingerprint strips, an unbroken chain of fingerprint strips can be formed having a suitable overlap between each adjacent strip, for example the three fingerprint image strip 22, 24, 26 shown in FIG. 7 are arranged laterally in series.

If the three fingerprint image strips 22, 24, 26 can be arranged laterally in series, then the width of the represented region of the fingerprint is equivalent to the sum of the widths of each of the arranged fingerprint image strips, minus the sum of the widths of the overlapping regions. If the width of this represented region exceeds a predetermined minimum width, then an acceptable template can be formed.

If an acceptable template cannot be formed, then further iterations are performed until an acceptable template can be formed from three or more of the scanned representations.

When an acceptable template can be formed, a reference fingerprint image template 34 is created.

Figure 9:
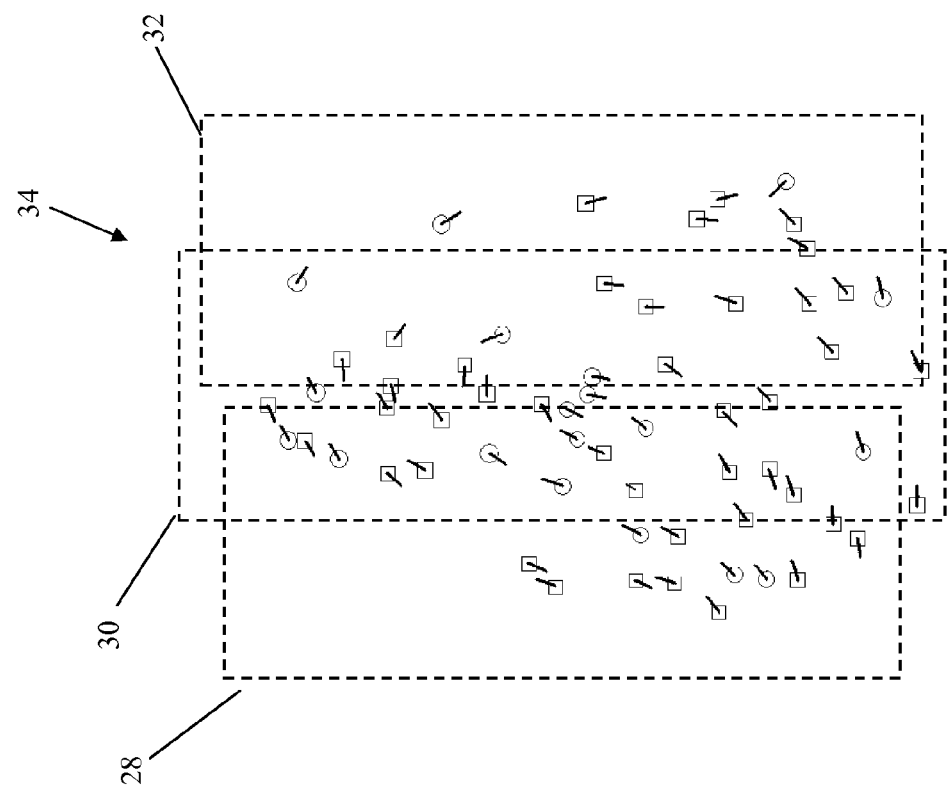
FIG. 9 shows a minutia representation of the fingerprint shown in FIG. 7 composed of the minutiae representations shown in FIGS. 8A-8C.

First, one of the fingerprint image strips 22, 24, 26 is selected as a reference fingerprint image strip. The minutiae representations of the other fingerprint image strips 22, 24, 26 are translated based on their matching parameters so as to be aligned relative to the reference fingerprint image strip. The aligned minutiae representations of the fingerprint image strips 22, 24, 26 are shown in FIG. 9.

The reference fingerprint image template 34 is formed by taking the union of the minutiae of all of the matched minutia representations which compose the acceptable template.

The enrolment process is then successfully terminated.

Whilst in the above described embodiment, the combining of the minutia is performed after determining that an acceptable template can be formed, it will be apparent that the minutia of each fingerprint image strip may alternatively be combined sequentially with those of the previously scanned fingerprint image strips upon each iteration of the method.

Matching

Figure 10:
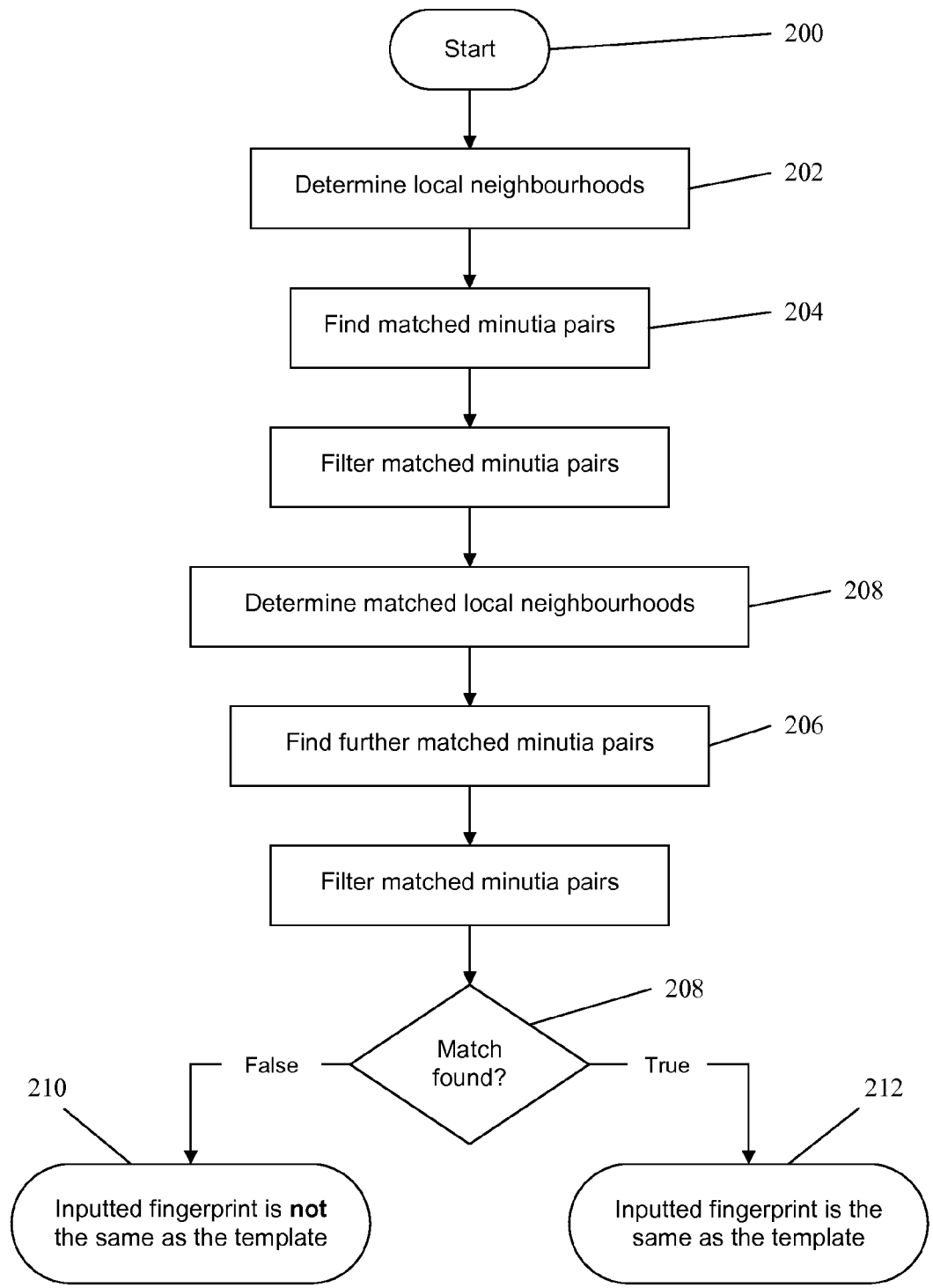
FIG. 10 is a flow chart showing a method of comparing an input fingerprint with a reference fingerprint image.
Figure 12:
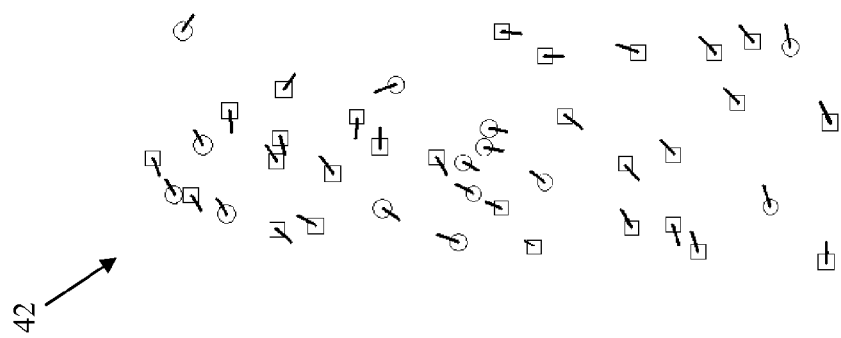
FIG. 12 shows a minutia representation of the portion shown in FIG. 11.
Figure 11:
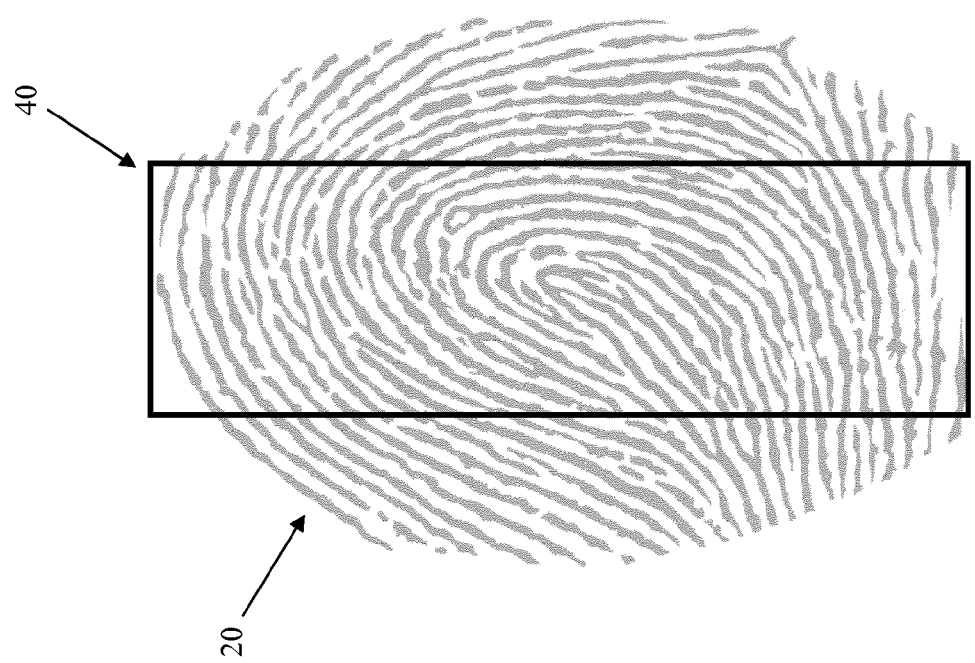
FIG. 11 shows the fingerprint image shown in FIG. 1 with a portion highlighted.

FIG. 10 is a flow chart showing a method of matching a first fingerprint to a second fingerprint for verifying the identity of the owner of the first fingerprint. The method will be described with reference to FIGS. 11 to 16 using an example where the first and second fingerprints are both scanned from the same finger, i.e. they match. The first fingerprint is a reference fingerprint image 20 and second fingerprint is an input fingerprint image 40. In this example, the reference fingerprint image 20 is a substantially complete fingerprint image 40 as shown in FIG. 11 and the input fingerprint image 40 is a portion 40 of the fingerprint image 20 shown in FIGS. 11 and 12. The fingerprint image 20 shown in FIG. 11, corresponds to the fingerprint images 20 shown in FIGS. 1 and 7.

The reference fingerprint image 20 has been enrolled by the above enrolment method using the fingerprint sensor 8 and is stored on the memory of the electronic card 2. The input fingerprint image 40 has been input by the fingerprint sensor 8. As the reference fingerprint image 20 and the input fingerprint image 40 have been scanned using the same fingerprint sensor 8, factors such as the resolution and quality of the two fingerprint images are consistent.

In alternative embodiments, other methods of input may also be used. For example, the reference fingerprint image 20 may be enrolled using an external fingerprint sensor 8 that is sufficiently large so as to capture the entire fingerprint. Also, the reference fingerprint image 20 may not be a complete fingerprint image, for example when the method is applied to match minutia representations of two fingerprint image strips, as in the enrolment method described above.

The first step of the matching method is to provide data defining a first set of minutiae 34 representing the reference fingerprint image 20, i.e. the reference fingerprint image template 34 enrolled previously, and a second set of minutiae 42 representing the input fingerprint image 40. The data comprises a first set of minutia vectors, defining the first set of minutiae, and a second set of minutia vectors, defining the second set of minutiae. The minutia vectors are as defined above. The first set of minutia vectors are retrieved from the memory. The second set of minutia vectors are received directly from the fingerprint sensor 8.

Next the first set of minutiae 34 and the second set of minutiae 42 are locally matched using local neighbourhoods 48.

Figure 13:
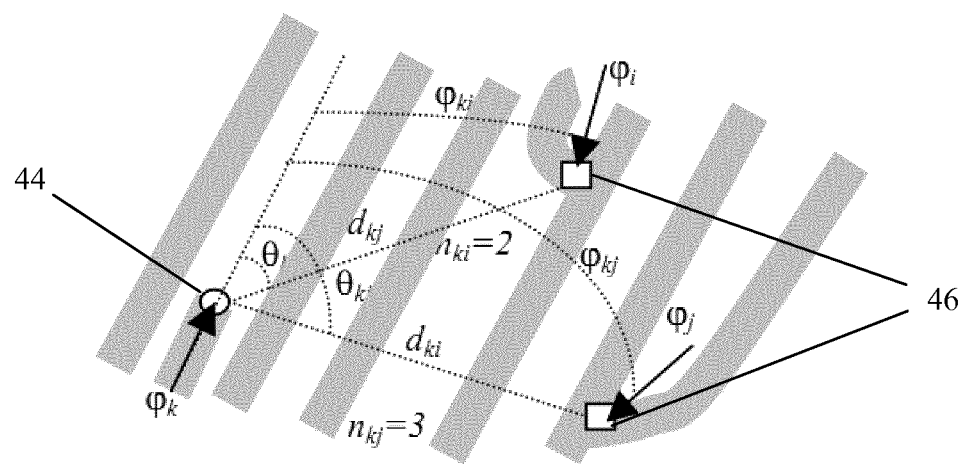
FIG. 13 shows a relationship between a central minutia and two neighbouring minutiae.

FIG. 13 shows a local neighbourhood 48 comprising a central minutia 44 and two neighbouring minutia 46. Each local neighbourhood 48 is centred around one minutia, which will be referred to as the central minutia 44, and comprises neighbouring minutiae 46 of the central minutia 44. The neighbouring minutiae 46 are any set of minutiae that may be consistently selected based on the central minutia 44, but must comprise at least one minutia, other than the central minutia 44 itself.

In this preferred embodiment, the neighbouring minutiae 46 consist of the closest n minutiae, i.e. the n minutia with the shortest distance from the central minutiae 44. The integer n may be any number of minutiae, for example the closest one, two, three, four, etc. minutiae. Whilst a larger number of neighbouring minutiae 46 is desirable in order to improve the probability of capturing at least one neighbouring minutiae 46 that appears in both sets of minutiae 34, 42, as will become apparent later, the number of matching steps in the following method increases proportionally with the square of the number of neighbouring minutiae in each neighbourhood. The inventors have identified that the use of the three closest neighbouring minutiae 46 provide optimal matching in the present embodiment; however, greater or fewer neighbouring minutiae 46 points may be optimal in other situations. For example, in situations where a sensor is more prone to false or missing minutiae, it may be desirable to include more neighbouring minutiae 46 in the local neighbourhoods 48, despite the increase in processing time.

The neighbouring minutiae 46 may alternatively include all minutiae within a predetermined distance of the central minutiae 44 and/or may be limited to minutiae of only a single type, such as the same type as the central minutia 44. The considerations discussed above regarding the number of neighbouring minutiae still apply in such embodiments.

For each local neighbourhood 48, a local minutia vector is generated. That is to say, a first set of local minutia vectors are generated based on the first set of minutia vectors and a second set of local minutia vectors is generated based on the second set of minutia vectors. Each local minutia vector corresponds to one of the minutia vectors and defines the relationship between the respective minutia, as the central minutia 44, and all of its neighbouring minutiae 46 within the local neighbourhood 48.

Each local minutia vector defines: distances between the central minutia 44 and each of the neighbouring minutiae 46; relative radial angles for each neighbouring minutiae 46, which are the relative angles between the minutia angle of the central minutia 44 and lines connecting the central minutia 44 and each of the neighbouring minutiae 46; and relative minutia angles for each neighbouring minutia 46, which are the relative angle between the minutia angle of each of the neighbouring minutiae 46 and the minutia angle of the central minutia 44. A local minutia vector may additionally define the types of the central minutia 44 and of its neighbouring minutiae 46.

In this embodiment, a local minutiae vector is composed of a plurality of local feature vectors. A local minutiae vector has a local feature vector for each neighbouring minutia 46 of the central minutia 44. Each local feature vector defines the relationship between the central minutiae 44 and that neighbouring minutia 46 and includes at least the relative distance, the radial angle and the minutia angle between the central minutia 44 and the respective neighbouring minutia 46. Thus, a local feature vector for minutia k and neighbouring minutia 46 i may be represented as:

$LF_{ki} = [d_{ki}, \theta_{ki}, \phi_{ki}]$, where $d_{ki}$ is the distance between the central minutia 44 and neighbouring minutia 46 i, $\theta_{ki}$ is the relative radial angle of the neighbouring minutia 46 i (between 180° and −180°), $\phi_{ki}$ is the relative minutia angle of the neighbouring minutia 46 i (between 180° and −180°), k is index of the central minutia and i is the index of the neighbouring minutia vector within the set of minutiae. Minutia angle of the central minutia is used as a angle reference.

That is to say, $$d_{ki} = \sqrt{(x_i - x_k)^2 + (y_i - y_k)^2}$$

$$\theta_{ki} = \tan^{-1}\left(\frac{y_i - y_k}{x_i - x_k}\right) - \varphi_k$$

$$\varphi_{ki} = \varphi_i - \varphi_k,$$

where $x_k$, $y_k$, and $\phi_k$ are the horizontal position, vertical position, and minutia angle, respectively, of the central minutia 44, $x_i$, $y_i$, and $\phi_i$ are the horizontal position, vertical position, and minutia angle, respectively, of neighbouring minutia 64 i.

Alternatively, where a constant number of neighbouring minutiae 46 are selected for each central minutia 44, the local minutia vector for a minutia may be represented as a vector of constant size. For example, when n=3, the local minutia vector for minutia k, where minutiae i, j and l are the closest neighbouring minutiae 46, may be represented as:

$L_k = [d_{ki}, d_{kj}, d_{kl}, \theta_{ki}, \theta_{kj}, \theta_{kl}, \phi_{ki}, \phi_{kj}, \phi_{kl}, t_k, t_i, t_j, t_l]$, where $d_{ki}$ is the distance between minutia i and minutia k, etc., $\phi_{ki}$ is the relative radial angle of minutia i and k (between 180° and −180°), etc., $\phi_{ki}$ is the relative minutia angle of minutia i and k (between 180° and −180°), etc., $t_i$ is a numerical representation of the type of the minutia, and i is index of the local minutia vector within set s.

Each local minutia vector is rotation and translation invariant, i.e. its values are independent of the orientation and position of the fingerprint image 20, 40. For example, if the fingerprint image 20, 40 were to be rotated and/or translated, the minutiae vectors would change, but the local minutiae vectors would not. This is useful because aligning the orientation and position of the two fingerprints 20, 40 is computationally intensive.

In the preferred embodiment, the distance between minutiae is measured in pixels. This does not affect the comparison because the reference fingerprint image 20 and the input fingerprint image 40 have been scanned using the same fingerprint sensor 8 and thus the resolution of each of the two fingerprint images 20, 40 is the same. However, where different sensors have been used, for example when the reference fingerprint image 20 has been pre-scanned using a high resolution scanner, the reference fingerprint image 20 and the input fingerprint image 40 may have different resolutions (measured, for example, using dots per inch). The local minutia vector may be made scale invariant by using a ridge count between minutiae instead of a pixel count to measure distance. In yet a further alternative, where the respective resolutions of the two sensors are known or can be calculated, a scaling factor may be applied to the position data of the one (or both) of the first and second sets of minutia vectors so as to make the scales consistent.

The first set of local minutia vectors and the second set of local minutia vectors are then matched to obtain a set of matched minutia pair vectors. The matching comprises comparing each local minutia vector in the first set of local minutia vectors with each local minutia vector in the second set of local minutia vectors, and generating a matched minutia vector when it is determined that two local minutia vectors match. Each matched minutia pair vector defines a minutia in the first set of minutiae and a minutia in the second set of minutiae which are considered to correspond to a single matched minutia 50.

In the comparison of a first local minutia vector, representing a local neighbourhood 48 of the reference fingerprint image 20, and a second local minutia vector, representing a local neighbourhood 48 of the input fingerprint image 40, each local feature vector of the first local minutia vector is compared with each local feature vector of the second local minutia vector. That is to say, each relationship between the central minutia 44 of the local neighbourhood 48 of the reference fingerprint image 20 and each of its neighbouring minutiae 46 is compared with each relationship between the central minutia 44 of the local neighbourhood 48 of the input fingerprint image 40 and each of its neighbouring minutiae 46. The number of comparisons is therefore equal to the product of the number of neighbouring minutiae 46. For example, where each local neighbourhood 48 consists of three neighbouring minutiae, there are nine comparisons made for each pair of local minutia vectors.

Based on the above comparison of local feature vectors, an optimal correspondence is determined between the first local minutia vector and the second local minutia vector. When the number of neighbouring minutiae is constant, each local feature vector in the first local minutia vector is associated with the most closely matching local feature vector in the second local minutia vector, i.e. the local feature vector having the lowest deviation. Suitable methods for determining optimal correspondence will be apparent to those skilled in the art.

A matched minutia candidate is determined when a deviation between at least one local feature vector of the first local minutia vector and the associated local feature vector of the second local minutia vector is below a predetermined local feature deviation threshold. The local feature deviation threshold defines a maximum allowable difference between the values of the local feature vector of the first and second local minutia vectors for each of distance, relative radial angle, and relative minutia angle between the respective central minutia 44 and neighbouring minutia 46. Other embodiments may improve the accuracy of the matching by only determining a match when at least two of, or even all of, the local feature vectors having an associated local feature vector have a deviation from their associated local feature vector below the predetermined local feature deviation threshold.

The matching next comprises determining a local similarity score for each matched minutia candidate. Where the local similarity score meets a predetermined threshold local similarity score, a matched minutiae pair vector is created for those corresponding minutiae.

The local similarity score between two local minutiae vectors is calculated based on a weighted absolute difference between at least one pair of associated local feature vectors, for example the local minutiae vectors having a deviation below the predetermined local feature deviation threshold. The following equation may be used to determine a local similarity score Ls where local feature vector $LF_1$ in the first local minutia vector matches local feature vector $LF_2$ in second local minutia vector:

$$Ls(i, j) = \begin{cases} \dfrac{t - |W \cdot (LF_1 - LF_2)|}{t}, & |W \cdot (LF_1 - LF_2)| < t \\ 0, & |W \cdot (LF_1 - LF_2)| \geq t \end{cases},$$

where t is a threshold value, W is a weighting vector, $LF_1$ is a local feature vector in the first local minutia vector, and $L_2$ is a local feature vector in the second local minutia vector.

The weighting vector is a predetermined vector that allows the different measures to be compared. The threshold value is calculated based on the local feature deviation threshold and the weighting vector. When the vectors are considered a match, the above equation will give a local similarity score between 1 and 0, with 1 being a perfect match and 0 being at the maximum allowable deviation. The weighting vector is determined empirically based on test data.

Each minutia should not appear in more than one matched minutiae pair vector as a minutia in one set cannot be the same as two minutiae in the other set. Where a minutia appears in two or more matched minutiae pair vectors, the matched minutiae pair(s) not having the highest local similarity score are removed such that no minutia appears in more than one matched minutiae pair vector within the set of matched minutia pair vectors. This may be done, for example, by ranking the set of minutiae pair vectors based on their local similarity score and processing them sequentially, in decreasing local similarity score order, and removing any minutia pair vectors including a repeated minutia (i.e. a minutia that has been matched to another minutia with a higher local similarity score) as they are encountered.

In addition to defining a minutiae in the first set of minutiae and minutiae in the second set of minutiae, each matched minutiae pair vector further defines the local similarity score between those minutiae, as well as a horizontal (x-direction) deviation, a vertical (y-direction) deviation and a minutia angle deviation between the corresponding minutia vectors in the first and second sets of minutia vectors. The horizontal, vertical and minutia angle deviations respectively correspond to the difference in absolute horizontal position, absolute vertical position and absolute minutia angle between the minutia in the first set and the minutia in the second set.

Thus, a matched minutia pair vector for minutia points i in the first set and j in the second set may be represented as:

$MP_{ij}$=[i, j, dx, dy, dϕ, Ls], where i is the index of the minutia in the first set of minutiae, j is the index of the minutia in the second set of minutiae, dx is difference between $x_{1i}$ and $x_{2j}$, dy is the difference between $y_{1i}$ and $y_{2j}$, dϕ is the difference between $\phi_{1i}$ and $\phi_{2j}$, and Ls is the similarity between local minutia vector i in the first set of local minutia vectors and local minutia vector j in the second set of local minutia vectors.

After the first and second sets of local minutia vectors have been matched, the matched minutiae 50 are then filtered. The filtering is performed based on the absolute positions of the matched minutiae 50 within the first and second sets minutiae 34, 42, i.e. based on the first and second sets of minutiae vectors.

The step of filtering is optional, but is beneficial in that it removes at least some matched pairs that do not correctly define a matched minutia 50. In some cases, because the minutiae have been compared using only a local frame of reference, it is possible for a minutia in the first set may to be matched with minutia in the second set having similar neighbouring minutiae 46, but which do not represent the same minutia. Where the two fingerprint images 20, 40 match, this error will typically become apparent when comparing the absolute positions of the first and second minutiae in their respective fingerprint images because the minutia represented by each of the minutia vectors will be in different places on the fingerprint images 20, 40.

In the preferred embodiment, the reference fingerprint image 20 and the input fingerprint image are scanned using the same fingerprint sensor 8. Therefore, their orientation and resolutions are substantially the same. Thus, if two minutiae vectors have been matched correctly, i.e. they represent the same minutia, a difference in horizontal and vertical displacement of that minutia between the first and second sets of minutia vectors should be similar to those of other correctly matched minutiae 50.

The filtering is performed using a sliding window algorithm having a predetermined tolerance. The tolerance defines the size of a range from a lower limit to an upper limit for each of a dx range and a dy range. The tolerance may be set during manufacture to values having been determined empirically based on test data previously. Alternatively, the tolerance values may be calculated dynamically for each comparison and may, for example, be based respectively on the variance of the dx and dy values of the matched pairs.

Figure 14:
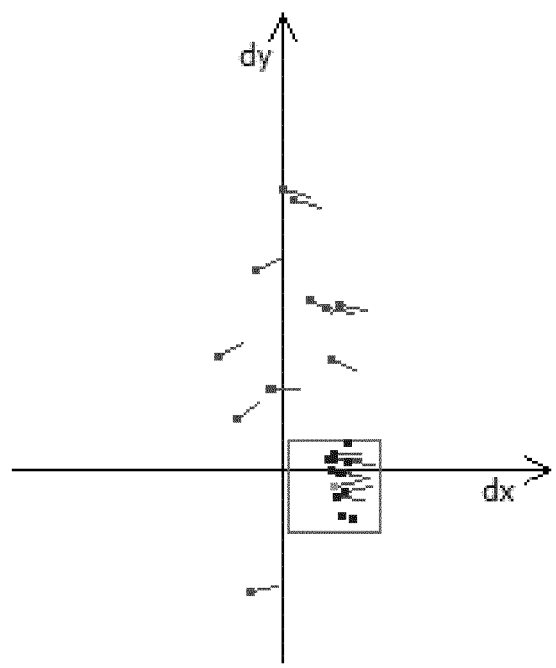
FIG. 14 shows a filter applied to a plot of relative displacement and orientation for matched minutiae between the representation shown in FIG. 2 and the representation shown in FIG. 12.

FIG. 14 shows a graphical representation of the application of the sliding window algorithm. The window defines a dx range and a dy range having a fixed tolerance. Any matched minutiae pair vectors having either a dx or dy value outside of either of the ranges are removed. The ranges are selected so as to capture the maximum number of matched minutiae pair vectors. Centre values of the dx and dy ranges of the window are positioned at points corresponding to the median dx and dy values respectively for the set of matched minutia pair vectors.

In an alternative arrangement the reference fingerprint image 20 and the input fingerprint image 40 may not share a common orientation, such as where the reference fingerprint image 20 and the input fingerprint image 40 are not scanned using the same fingerprint sensor 8. This may be detected based on an average of the dϕ values. Where this average dϕ is about zero, or at least within of a set range (such as within about ±10 degrees), the fingerprints may be considered as being substantially aligned. Where the average dϕ is not about zero, the rotational offset will affect the relative displacements of different minutiae pairs differently. In such cases, a transformation may need to be applied to the x and y values of either the first or the second set of minutia points in order to correctly align the first and second data points to apply the above filtering algorithm Following the filtering, the remaining matched minutiae pair vectors are considered define matched minutiae 50, i.e. each matched minutiae pair vector is considered to represent a common minutia appearing in both the first and second sets of minutiae. Matched minutiae pairs that were removed by the filtering are considered to have defined two unmatched minutiae.

The first and second sets of minutiae 34, 42 will typically not correspond exactly. This may be for a number of reasons including errors when scanning the print and extracting the minutiae meaning that not all of the minutiae are extracted or that false minutiae are scanned. Additionally, where the inputted (or reference) fingerprint image 40 is a partial fingerprint image 40, a number of minutiae of the complete fingerprint image 20 will be outside of the partial fingerprint image 40 and thus cannot be extracted from the partial fingerprint image 40. The fingerprint sensor 8 used in this example has a narrow width meaning that all scanned fingerprints will therefore be partial fingerprints. However, even larger fingerprint sensors may scan only partial fingerprints, such as if there is a fault with a portion of the scan area, where a part of the sensor or the fingerprint is obscured, or where the finger is not correctly aligned with the scan area of the fingerprint sensor 8.

When the minutia in the first and second sets of minutiae 34, 42 do not correspond exactly, a minutia may appear in both the first and second sets of minutiae, but may not be matched because it has a different local neighbourhood 48 in each of the sets, i.e. one or more of its neighbouring minutiae 46 do not appear in both the first or second sets of minutiae 34, 42. That is to say, if the neighbouring minutiae 46 of a central minutia 44 in either of the first or second sets of minutiae 34, 42 include false minutiae or should include minutiae that were not scanned, that central minutia 44 cannot be matched based on those local minutiae vectors.

Figure 15B:
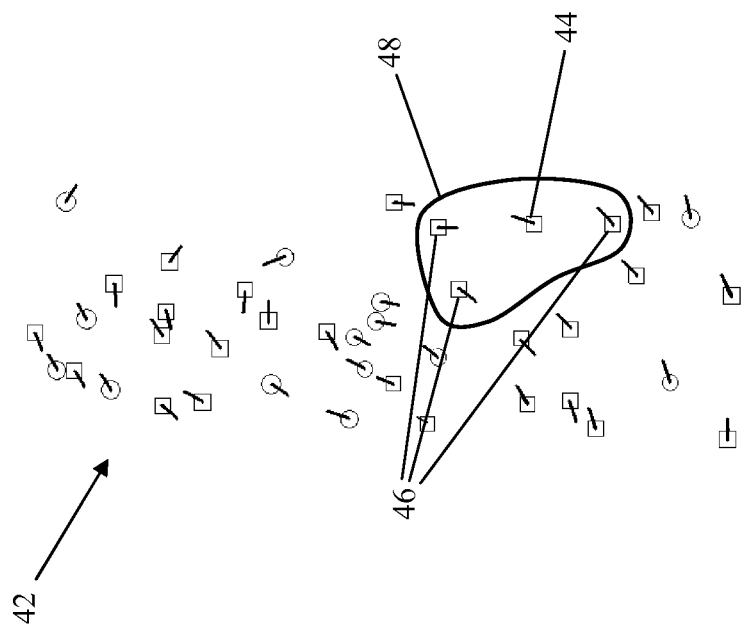
FIG. 15B shows a relationship between the same central minutia and its three closest neighbouring minutiae in the portion representation shown in FIG. 12.
Figure 15A:
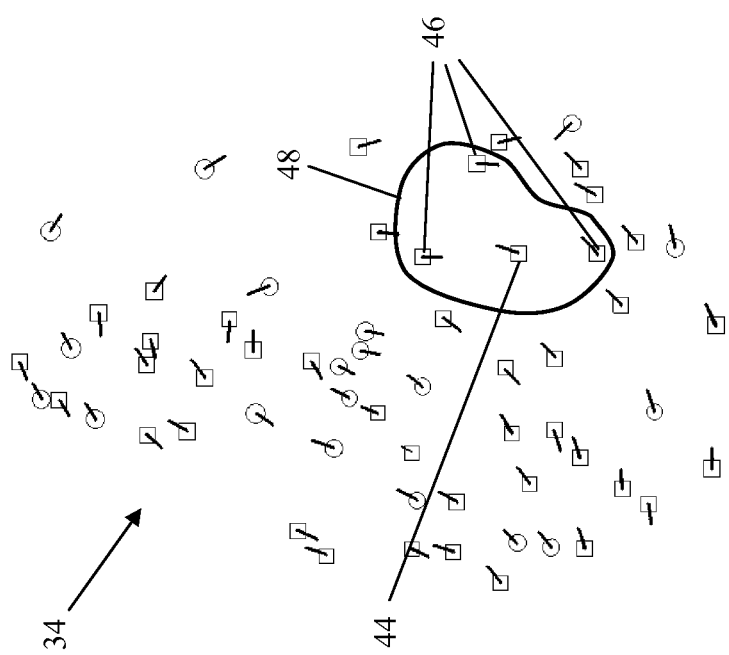
FIG. 15A shows a relationship between a central minutia and its three closest neighbouring minutiae in the fingerprint representation shown in FIG. 2.

This can be seen with reference to the example shown in FIGS. 15A and 15B. These figures show a local neighbourhood 48 including the three closest neighbouring minutiae 46 to a central minutia 44. As can be seen in FIG. 15A, the local neighbourhood 48 for the reference fingerprint image 20, which is a complete fingerprint, includes a missing minutia that is not present in the input fingerprint image 40, shown in FIG. 15B, which is a partial fingerprint. As such, although the central minutia 44 of this local neighbourhood 48 appears in both the reference fingerprint image 20 and the input fingerprint image 40, it cannot be matched as its local neighbourhood 48 is different in the two fingerprint images 20, 40.

According to the present method, the first set of minutiae 32 and the second set of minutiae 42 are then matched in a second step of matching using matched local neighbourhoods 54. The matched local neighbourhoods 54 are similar to the above described local neighbourhoods 48, but only include matched neighbouring minutiae 52.

The matched neighbouring minutiae 52 of a central minutia 44 comprise a set of minutiae that can be consistently selected based on the central minutia 44, where those minutiae are also matched minutiae 50, i.e. they were matched previously to a minutia in the other set of minutiae 34, 42. The matched neighbouring minutiae 52 must comprise at least one minutia, other than the central minutia 44 itself.

In this preferred embodiment the matched neighbouring minutiae 52 are the closest three matched neighbouring minutia 52. That is to say, they are the closest three matched minutiae 50 to the central minutia 44.

New local minutiae vectors are determined for the matched local neighbourhoods 54 of minutiae that were not previously matched (i.e. those minutiae that are not matched minutiae 50), these local minutiae vectors are referred to as the unmatched local minutiae vectors.

Figure 16B:
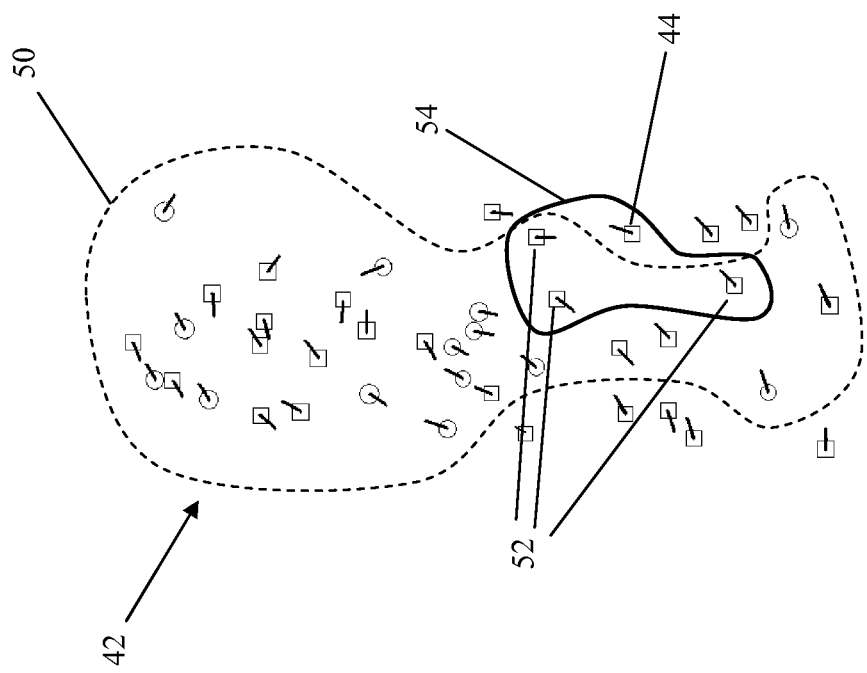
FIG. 16B shows a relationship between the same minutia and its three closest neighbouring matched minutiae in the portion representation shown in FIG. 12.
Figure 16A:
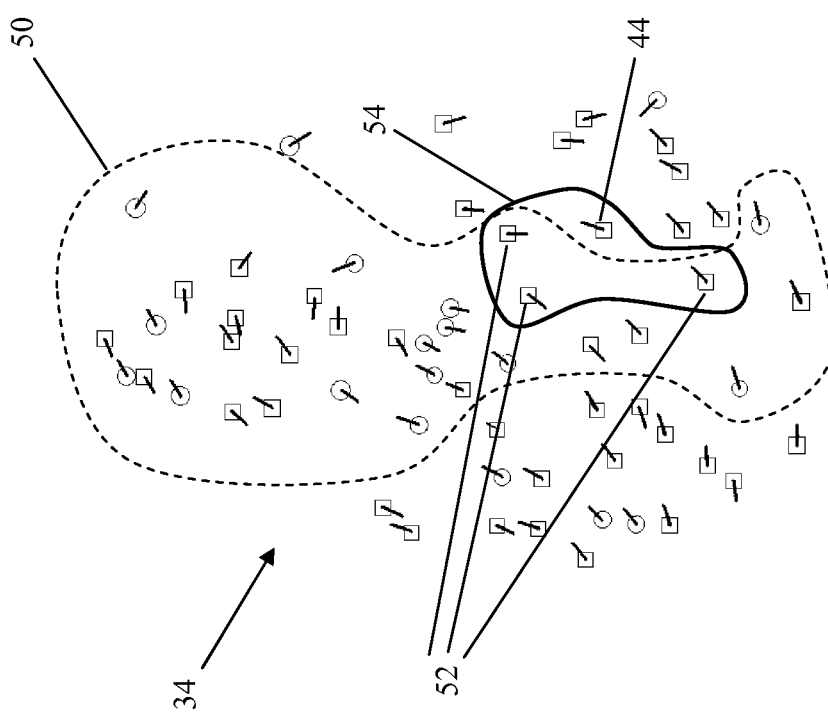
FIG. 16A shows a relationship between the same minutia and its three closest neighbouring matched minutiae in the fingerprint representation shown in FIG. 2.

FIGS. 16A and 16B show the matched local neighbourhoods 54 for the same central minutia 44 as in FIGS. 15A and 15B. These Figures also highlight the set of matched minutiae 50 that appear in both sets of minutiae. As can be see, because the matched local neighbourhoods 54 are defined only with reference to minutia appearing in both the reference fingerprint image 20 and the input fingerprint image 40, the same matched local neighbourhood 54 is determined for both sets of minutiae 34, 42. Thus, these minutiae can now be matched using their matched local neighbourhoods 54.

The unmatched local minutiae vectors corresponding to the first and second sets of minutiae 34, 42 are then matched to produce a further set of matched minutiae pairs. This further set of matched minutiae pairs is then combined with the previously determined set of matched minutiae pairs. The matching is performed by the method discussed above.

Where a minutia appears in both the first and second sets of minutiae 34, 42, but was not matched previously due to a false or missing minutiae being included in one of the minutia's local neighbourhood 48 but not the other, this subsequent step of matching should correctly match the minutiae in the two sets. This is because this step of matching is based on a matched local neighbourhood 54, which only includes matched minutiae 50, i.e. minutiae appearing in both sets, and therefore will not include those false or missing minutiae.

As above, each minutia cannot appear in more than one matched minutiae pair vector. Therefore, where a minutia appears in two or more matched minutiae pair vectors, the matched minutiae pair(s) not having the highest local similarity score are removed such that no minutia appears in more than one matched minutiae pair vector.

After the first and second sets of unmatched local minutia vectors have been matched, the matched minutiae 50 are filtered. The filtering is again performed based on the relative absolute positions of the minutiae between the first and second sets.

This step of filtering is also optional, but provides similar benefits to the step of filtering above. Particularly, as the matching is based only on a local coordinate system, the absolute positions of matched minutiae 50 in the first and second sets of minutiae 34, 42 should be compared to remove pairs having significantly different relative absolute positions.

The filtering is preferably performed using the sliding window function discussed above. In this embodiment, all of the matched minutiae 50 are filtered (i.e. those determined by both the first and second steps of matching). Alternatively, but less preferred, only the matched minutiae 50 that have not been filtered previously may be filtered.

It is then determined whether the reference fingerprint image 20 and the input fingerprint image 40 match. This is based at least in part on the number of matched minutiae 50 (i.e. the number of matched minutiae pair vectors), and also on the number of minutiae in the first set of minutiae 34 and the number of minutiae in the second set of minutiae 42. The determination is preferably based on a set of statistical parameters including at least one of: the number of matched minutiae 50; the number of minutiae in the first set of minutiae 34; the number of minutiae in the second set of minutiae 42; the number of matched minutiae 50 of the same minutia type; the number of matched minutiae 50 having a similarity above a predetermined threshold; and the area occupied by the matched minutiae 50.

In the preferred embodiment, the reference fingerprint image 20 and the input fingerprint image 40 are considered to be matched if d is true for the following equation:

$$d = p_e < \text{matchTresh} \wedge n_m > \text{matchesNumMin} \wedge a > \text{areaMin},$$

where $n_m$ is the number of matched minutiae 50, a is the area of overlap between the reference fingerprint image 20 and the input fingerprint image 40, and $p_e$ a match error probability calculated as the product of three independent probabilities:

$$p_e = p_{me} * p_{te} * p_{pe}$$

Term $p_{me}$ is the probability for a randomly generated set of input minutia features to be matched to subset of template features looking only at minutia position, and is determined as by:

$$p_{me} = \sum_{k=n_m}^{n_{fT}} \binom{n_f}{k} p^k (1-p)^{n_f - k}$$

where p is probability for one randomly generated minutia to be matched with one minutia from the first (template set).

Term $p_{te}$ is the probability that there are $n_t$ randomly generated minutiae which have same type as matching minutiae from the template. Term $p_{pe}$ denotes probability that there are $n_p$ matched minutiae with very high similarity score, higher than certain constant threshold $p_{p1}$, which is determined experimentally. Introduction of $p_{pe}$ improves overall performance, because it reduces possibility of accidental matching.

$$p_{te} = \binom{n_m}{n_t}(0.5)^{n_t}$$

$$p_{pe} = \binom{n_m}{n_p} p_{p1}^{n_p}$$

By the method described above, two fingerprints may be efficiently and effectively matched, even when one or both of the fingerprints is a partial fingerprint or is prone to false or missing minutiae.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method of comparing a first set of minutiae and a second set of minutiae, each minutia of the first and second sets of minutiae having a position and a minutia angle within the set of minutiae, the method comprising:
    determining a first local neighbourhood for each minutia in the first set of minutiae and for each minutia in the second set of minutiae, wherein each first local neighbourhood includes at least one minutia neighbouring the respective minutia;
    comparing the first local neighbourhoods of the minutiae in the first set of minutiae with the first local neighbourhoods of the minutiae in the second set of minutiae to determine matched minutiae appearing in both the first and second sets of minutiae, wherein each minutia that is not a matched minutia is an unmatched minutia;
    after determining the matched minutiae, filtering the matched minutiae based on the position and/or orientation of each of the matched minutiae within the first and second sets of minutiae, wherein filtering the matched minutiae comprises:
        determining a relative position and/or a relative orientation of each matched minutia between the first and second sets of minutiae; and
        filtering out matched minutiae having a relative position and/or a relative orientation that is outside of an allowable region, wherein the allowable region has a predetermined range and is positioned so as to maximise the number of matched minutiae within the range;
    after filtering the matched minutiae, determining a second local neighbourhood for each unmatched minutia in the first set of minutiae and for each unmatched minutia in the second set of minutiae, wherein each second local neighbourhood includes at least one matched minutia neighbouring the respective unmatched minutia; and
    comparing the second local neighbourhoods of the unmatched minutiae in the first set of minutiae with the second local neighbourhoods of the unmatched minutiae in the second set of minutiae to determine further matched minutiae appearing in both the first and second sets of minutiae.

2. A method as claimed in claim 1, wherein the first set of minutiae represents a portion of a first fingerprint and the second set of minutiae represents a portion of a second fingerprint.

3. A method as claimed in claim 2, further comprising:
    determining whether the first and second fingerprints are the same based on the matched minutiae and the further matched minutiae.

4. A method as claimed in claim 1, wherein comparing the local neighbourhoods is based at least one of: a relative position, a relative orientation and a relative minutia angle of each of the at least one neighbouring minutia relative to a central minutia of the respective first local neighbourhood.

5. A method as claimed in claim 1, further comprising:
    for each first local neighbourhood, determining a relative relationship between a central minutia of the first local neighbourhood and each of the at least one neighbouring minutia,
    wherein comparing the first local neighbourhoods comprises comparing each relative relationship of the first local neighbourhoods of the minutiae in the first set of minutiae with each relative relationship of the first local neighbourhoods of the minutiae in the second set of minutiae, and
    wherein a matched minutiae is determined as appearing in both the first and second sets of minutiae when a difference between one relative relationship of the first local neighbourhood of the respective minutiae in one of the sets of minutiae and one relative relationship of the first local neighbourhood of the respective minutiae in the other set of minutiae is below a predetermined threshold.

6. A method as claimed in claim 5, further comprising:
    for each second local neighbourhood, determining a relative relationship between a central minutia of the second local neighbourhood and each of the at least one neighbouring matched minutia,
    wherein comparing the second local neighbourhoods comprises comparing each relative relationship of the second local neighbourhoods of the unmatched minutiae in the first set of minutiae with each relative relationship of the second local neighbourhoods of the unmatched minutiae in the second set of minutiae, and wherein a further matched minutiae is determined as appearing in both the first and second sets of minutiae when a difference between one relative relationship of the second local neighbourhood of the respective unmatched minutiae in one of the sets of minutiae and one relative relationship of the second local neighbourhood of the respective unmatched minutiae in the other set of minutiae is below a predetermined threshold.

7. A method as claimed in claim 1, further comprising:
determining similarity scores based on a similarity between each first local neighbourhood of the first set of minutiae and each first local neighbourhood of the second set of minutiae, and determining a matched minutia only when a corresponding similarity score meets a predetermined similarity threshold; and
determining similarity scores based on a similarity between each second local neighbourhood of the first set of minutiae and each second local neighbourhood of the second set of minutiae, and determining a further matched minutia only when a corresponding similarity score meets a predetermined similarity threshold.

8. A method as claimed in claim 7, further comprising:
determining whether a minutia in the one of the first and second sets of minutia has been matched with two or more minutiae in the other set and, if so, selecting the matching having a higher similarity score.

9. A method as claimed in claim 1, further comprising:
after determining the further matching minutiae, filtering the matched minutiae based on the position and/or orientation of each of the matched minutiae within the first and second sets of minutiae.

10. A method as claimed in claim 1, wherein the at least one neighbouring minutia includes the three closest neighbouring minutiae.

11. A method as claimed in claim 1, wherein the at least one neighbouring matched minutia includes the three closest neighbouring matched minutiae.

12. A data processing apparatus comprising a memory and a processor, the memory storing instructions that when executed will cause the processor to perform the method of claim 1.

13. A non-transitory computer-readable medium comprising instructions stored thereon that, when executed, will cause a processor to perform a method as claimed in claim 1.

14. A method of comparing a first set of minutiae and a second set of minutiae, the method comprising:
determining a first local neighbourhood for each minutia in the first set of minutiae and in the second set of minutiae, wherein each first local neighbourhood includes at least one minutia neighbouring the respective minutia;
for each first local neighbourhood, determining a relative relationship between a central minutia of the first local neighbourhood and each of the at least one neighbouring minutia;
comparing each relative relationship of the first local neighbourhoods of the minutiae in the first set of minutiae with each relative relationship of the first local neighbourhoods of the minutiae in the second set of minutiae;
determining matched minutiae appearing in both the first and second sets of minutiae when a difference between one relative relationship of the respective first local neighbourhood of the minutiae in one of the sets of minutiae and one relationship of the first local neighbourhood of the minutiae in the other set of minutiae is below a predetermined threshold; and
filtering the matched minutiae based on the position and/or orientation of each of the matched minutiae within the first and second sets of minutiae, wherein filtering the matched minutiae comprises:
determining a relative position and/or a relative orientation of each matched minutia between the first and second sets of minutiae; and
filtering out matched minutiae having a relative position and/or a relative orientation that is outside of an allowable region, wherein the allowable region has a predetermined range and is positioned so as to maximise the number of matched minutiae within the range.

15. A method as claimed in claim 14, further comprising:
determining similarity scores based on a similarity between each first local neighbourhood of the first set of minutiae and each first local neighbourhood of the second set of minutiae, and determining a matched minutia only when a corresponding similarity score meets a predetermined similarity threshold.

16. A method as claimed in claim 15, further comprising:
determining whether a minutia in the one of the first and second sets of minutia has been matched with two or more minutiae in the other set and, if so, selecting the matching having a higher similarity score.

17. A method as claimed in claim 14, wherein the first set of minutiae represents a portion of a first fingerprint and the second set of minutiae represents a portion of a second fingerprint.

18. A method as claimed in claim 17, further comprising:
determining whether the first and second fingerprints are the same based on the matched minutiae.

19. A method as claimed in claim 14, wherein comparing the first local neighbourhoods is based at least one of: a relative position, a relative orientation and a relative minutia angle of each of the at least one neighbouring minutia relative to a central minutiae of the respective first local neighbourhood.

20. A method as claimed in claim 14, wherein the at least one neighbouring minutia includes the three closest neighbouring minutiae.

21. A data processing apparatus comprising a memory and a processor, the memory storing instructions that when executed will cause the processor to perform the method of claim 14.

22. A non-transitory computer-readable medium comprising instructions stored thereon that, when executed, will cause a processor to perform a method as claimed in claim 14.

23. A method of comparing a first set of minutiae and a second set of minutiae, the method comprising:
determining a first local neighbourhood for each minutia in the first set of minutiae and for each minutia in the second set of minutiae, wherein each first local neighbourhood includes at least one minutia neighbouring the respective minutia;
comparing the first local neighbourhoods of the minutiae in the first set of minutiae with the first local neighbourhoods of the minutiae in the second set of minutiae to determine matched minutiae appearing in both the first and second sets of minutiae, comprising:
determining similarity scores based on a similarity between each first local neighbourhood of the first set of minutiae and each first local neighbourhood of the second set of minutiae; and determining a matched minutia only when a corresponding similarity score meets a predetermined similarity threshold, wherein each minutia that is not a matched minutia is an unmatched minutia;

determining a second local neighbourhood for each unmatched minutia in the first set of minutiae and for each unmatched minutia in the second set of minutiae, wherein each second local neighbourhood includes at least one matched minutia neighbouring the respective unmatched minutia; and comparing the second local neighbourhoods of the unmatched minutiae in the first set of minutiae with the second local neighbourhoods of the unmatched minutiae in the second set of minutiae to determine further matched minutiae appearing in both the first and second sets of minutiae, comprising:

determining similarity scores based on a similarity between each second local neighbourhood of the first set of minutiae and each second local neighbourhood of the second set of minutiae; and determining a further matched minutia only when a corresponding similarity score meets a predetermined similarity threshold, wherein at least one of determining the matched minutia and determining the further matched minutia comprises:

determining whether a minutia in the one of the first and second sets of minutia has been matched with two or more minutiae in the other set and, if so, selecting the matching having a higher similarity score.

24. A data processing apparatus comprising a memory and a processor, the memory storing instructions that when executed will cause the processor to perform the method of claim 23.

25. A non-transitory computer-readable medium comprising instructions stored thereon that, when executed, will cause a processor to perform a method as claimed in claim 23.

26. A method of comparing a first set of minutiae and a second set of minutiae, the method comprising:

determining a first local neighbourhood for each minutia in the first set of minutiae and in the second set of minutiae, wherein each first local neighbourhood includes at least one minutia neighbouring the respective minutia;

for each first local neighbourhood, determining a relative relationship between a central minutia of the first local neighbourhood and each of the at least one neighbouring minutia;

comparing each relative relationship of the first local neighbourhoods of the minutiae in the first set of minutiae with each relative relationship of the first local neighbourhoods of the minutiae in the second set of minutiae; and determining matched minutiae appearing in both the first and second sets of minutiae when a difference between one relative relationship of the respective first local neighbourhood of the minutiae in one of the sets of minutiae and one relationship of the first local neighbourhood of the minutiae in the other set of minutiae is below a predetermined threshold, the determining comprising:

determining similarity scores based on a similarity between each first local neighbourhood of the first set of minutiae and each first local neighbourhood of the second set of minutiae;

determining a matched minutia only when a corresponding similarity score meets a predetermined similarity threshold; and determining whether a minutia in the one of the first and second sets of minutia has been matched with two or more minutiae in the other set and, if so, selecting the matching having a higher similarity score.

27. A data processing apparatus comprising a memory and a processor, the memory storing instructions that when executed will cause the processor to perform the method of claim 26.

28. A non-transitory computer-readable medium comprising instructions stored thereon that, when executed, will cause a processor to perform a method as claimed in claim 26.

* * * * *